US012810453B2

(12) United States Patent
Ahmed et al.

(10) Patent No.: US 12,810,453 B2
(45) Date of Patent: Nov. 24, 2026

(54) USING A NEURAL NETWORK SCENE REPRESENTATION FOR MAPPING

(71) Applicant: XYZ REALITY LIMITED, London (GB)

(72) Inventors: Umar Ahmed, London (GB); Rigas Kouskouridas, London (GB); Shuda Li, London (GB); David Mitchell, London (GB); Georgi Tinchev, London (GB)

(73) Assignee: XYZ REALITY LIMITED, London (GB)

( * ) Notice: Subject to any disclaimer, the term of this patent is extended or adjusted under 35 U.S.C. 154(b) by 246 days.

(21) Appl. No.: 18/712,402

(22) PCT Filed: Nov. 18, 2022

(86) PCT No.: PCT/EP2022/082387
§ 371 (c)(1),
(2) Date: May 22, 2024

(87) PCT Pub. No.: WO2023/094271
PCT Pub. Date: Jun. 1, 2023

(65) Prior Publication Data

US 2025/0014200 A1 Jan. 9, 2025

(30) Foreign Application Priority Data

Nov. 24, 2021 (GB) ...................................... 2116926

(51) Int. Cl.
*G06T 7/579* (2017.01)
*G06V 10/82* (2022.01)
*G06V 20/56* (2022.01)

(52) U.S. Cl.
CPC .............. *G06T 7/579* (2017.01); *G06V 10/82* (2022.01); *G06V 20/56* (2022.01)

(58) Field of Classification Search
CPC ......... G06T 7/579; G06V 10/82; G06V 20/56
See application file for complete search history.

(56) References Cited

U.S. PATENT DOCUMENTS 10,685,446 B2 * 6/2020 Fleishman ............. G06V 10/82
10,719,759 B2 * 7/2020 Kutliroff ............ G01C 21/3833
(Continued)

FOREIGN PATENT DOCUMENTS

CN 111476190 A 7/2020
EP 3712802 A1 9/2020
WO 2021/191120 A1 9/2021

OTHER PUBLICATIONS

International Search Report and Written Opinion in PCT/EP2022/082387 mailed Feb. 17, 2023, 10 pages.
(Continued)

*Primary Examiner* — Gregory M Desire
(74) *Attorney, Agent, or Firm* — Rothwell, Figg, Ernst & Manbeck, P.C.

(57) ABSTRACT

Certain examples described herein relate to a mapping system. An example mapping system has a differentiable mapping engine to receive image data comprising a sequence of images captured using one or more camera devices of an object as it navigates an environment and a neural network scene representation comprising a neural network architecture trained to map input coordinate tensors indicating at least a point location in three-dimensional space to scene feature tensors having a dimensionality greater than the input tensors. The neural network scene representation is communicatively coupled to the differentiable mapping engine and the differentiable mapping engine is configured to use the neural network scene representation as a mapping of the environment during operation of the differentiable mapping engine.

17 Claims, 13 Drawing Sheets

(56) References Cited

U.S. PATENT DOCUMENTS

| | | | | |
|---|---|---|---|---|
| 10,726,570 | B2 * | 7/2020 | DeTone | G06T 7/337 |
| 10,915,731 | B2 * | 2/2021 | Mccormac | G06V 20/64 |
| 11,030,476 | B2 * | 6/2021 | Xu | H04N 7/188 |
| 11,455,740 | B2 * | 9/2022 | Vendas Da Costa | G06T 5/70 |
| 11,900,256 | B2 * | 2/2024 | Moloney | G06N 3/045 |
| 11,915,488 | B2 * | 2/2024 | Ramirez Llanos | G06V 20/56 |
| 12,140,696 | B2 * | 11/2024 | Chen | G01S 7/417 |
| 12,205,297 | B2 * | 1/2025 | Zhi | G06T 7/174 |
| 12,333,802 | B2 * | 6/2025 | Curtis | G06F 18/251 |
| 12,462,423 | B2 * | 11/2025 | Brown | G06N 3/0985 |

OTHER PUBLICATIONS

Sucar, E. et al., "iMAP: Implicit mapping and positioning in real-time," arxiv.org, Cornell University Library, 201 Olin Library Cornell University Ithaca, NY, Sep. 13, 2021, 10 pages.

Mildenhall, B. et al., "NeRF: representing scenes as neural radiance fields for view synthesis," Communications of the ACM , Aug. 3, 2020, 25 pages.

Chen, C. et al., "A survey on deep learning for localization and mapping: Towards the age of spatial machine intelligence," arxiv.org, Jun. 29, 2020, 26 pages.

Tewari, A et al., "Advance in neural rendering," arxiv.org, Cornell University Library, 201 Olin Library Cornell University Ithaca, NY, Nov. 10, 2021, 29 pages.

Combined Search and Examination Report in GB 2116926.3 mailed Apr. 29, 2022, 7 pages.

* cited by examiner

USING A NEURAL NETWORK SCENE REPRESENTATION FOR MAPPING

CROSS REFERENCE TO RELATED APPLICATION(S)

This application is a 35 U.S.C. § 371 National Stage of International Patent Application No. PCT/EP2022/082387, filed Nov. 18, 2022, claiming benefit from GB Patent Application No. 2116926.3, filed Nov. 24, 2021, designating the United States, the disclosures of which are incorporated herein in their entirety.

TECHNICAL BACKGROUND

The present invention relates to using a neural network scene representation for mapping an environment. In certain described embodiments, the present invention uses a neural network scene representation as a mapping system while performing simultaneous localisation and mapping (SLAM), for example in place of a point cloud representation. The neural network scene representation comprises a neural network architecture that is used to map at least point locations in three-dimensional space to higher dimensionality feature vectors. When coupled with a differentiable mapping engine, a complete SLAM system may be provided that may be trained and optimised in an end-to-end manner.

BACKGROUND OF THE INVENTION

In the field of computer vision and robotics, there is often a need to construct a representation of an environment, such as a three-dimensional space that is navigable using a robotic or handheld device. Constructing a representation of a three-dimensional space allows a real-world environment to be mapped to a virtual or digital realm, where a map of the environment may be used and manipulated. It also allows an object to be tracked or located with reference to the representation of the space. For example, a moveable robotic device may require a representation of a three-dimensional space to allow simultaneous localisation and mapping SLAM), and thus navigation of and/or interaction with its environment, or a user with a smartphone may wish to view an augmented reality display where an information model of the environment is aligned with a view of the environment.

There are several techniques available for constructing a representation of an environment. For example, structure from motion and multi-view stereo are two techniques that may be used to do this. Many techniques extract features from images of the environment. These features are then correlated from image to image to determine a trajectory of a camera device and build a three-dimensional representation. This trajectory may comprise a representation of camera poses over time, and thus allow two-dimensional features extracted from images to be mapped to three-dimensional points in a three-dimensional map.

Certain techniques that use a reduced number of points or features to generate a representation are referred to as "sparse" techniques. For example, these techniques may extract a small number of features from each image and/or may build a three-dimensional map with a small number of defined points. Extracted features may include scale-invariant feature transform (SIFT) or speeded up robust features (SURF) features and are sometimes referred to as "key points". Features may be extracted for a subset of "key" frames within a video feed (i.e., "key" may refer to spatially and/or temporally "key" features). In the past, features were often "hand-crafted", e.g. based on human designed feature extraction functions. Unique features may be identified and correlated across images to determine a transformation that mathematically represents how identified features change from image to image. For example, these features often represent corners or other visually distinctive areas of an image, and ten to a hundred features may be detected per image. A time-invariant three-dimensional map of an environment may then be generated, where the features are projected to points in the map. Recently, these "sparse" approaches have been complemented with "dense" techniques. These "dense" solutions typically track an object using all the pixels within a captured imaged, effectively using millions of "features". They may also generate maps with many thousands or millions of points. "Sparse" techniques have an advantage that they are easier to implement in real-time, e.g. at a frame rate of 30 frames-per-second or so as using a limited number of points or features limits the extent of the processing that is required to perform SLAM. Comparatively it is more difficult to perform real-time "dense" mapping of an environment due to computational requirements. For example, it is often preferred to carry out a "dense" mapping off-line, e.g. it may take 10 hours to generate a "dense" representation from 30 minutes of provided image data.

In recent years, researchers have also started integrating deep learning approaches into SLAM systems. Deep learning in this sense refers to multi-layer neural network implementations, commonly trained using backpropagation and a form of gradient descent. It has been found that incorporating newer deep learning methods often requires a complete redesign of older SLAM systems, which typically concentrated on hand-picked features that are aligned using least squares optimisations and contained discontinuities that prevented auto-differentiation. As such, like many other fields, SLAM researchers often refer to "traditional" older SLAM methods that do not use deep learning methods (i.e., multilayer neural network architectures) and "deep" or "deep learning" SLAM methods that do. Examples of "traditional" SLAM methods include ORB-SLAM and LSD-SLAM, as respectively described in the papers "ORB-SLAM: a Versatile and Accurate Monocular SLAM System" by Mur-Artal et al. published on ar Xiv on 3 Feb. 2015 and "LSD-SLAM: Large-Scale Direct Monocular SLAM" by Engel et al as published in relation to the European Conference on Computer Vision (ECCV), 2014, both of these publications being incorporated by reference herein. Example SLAM systems that incorporate neural network architectures include "CodeSLAM—Learning a Compact Optimisable Representation for Dense Visual SLAM" by Bloesch et al (published in relation to the Conference on Computer Vision and Pattern Recognition—CVPR-2018) and "CNN-SLAM: Real-time dense Monocular SLAM with Learned Depth Prediction" by Tateno et al (published in relation to CVPR 2017), these papers also being incorporated by reference herein. Often deep learning SLAM systems comprise convolutional neural networks (CNNs) that are trained to extract features from input images, the extracted features then being used as per the hand-coded features extracted within traditional SLAM methods. There is also often an overlap between the four versions of SLAM: sparse methods tend to be applied in traditional SLAM where hand-engineered features are extracted using custom methods and dense methods tend to be applied in deep learning SLAM systems that operate directly on input images (e.g., via a CNN).

The different SLAM methods described above all have different advantages and disadvantages. Developments tend to arise within these niche fields by improving previous methodologies and so implementations that cross these niche fields are rare. Traditional and sparse SLAM methods are often much faster and more robust, typically being able to operate in real-time on a Central Processing Unit (CPU) without dedicated Graphical Processing Unit (GPU) support. Deep learning SLAM methods often require offline training procedures that take days or weeks on high-specification clusters of graphically accelerated server devices. Even at run time, during a so-called inference stage, deep learning SLAM systems often require a GPU to be present and so are difficult to run in real-time on a wide variety of devices. Similar computation demands apply for other dense methods.

In general, most SLAM systems still suffer from accuracy limitations—there is no perfect SLAM system and animal-level environmental awareness is a "hard" engineering problem that human beings are only just beginning to understand. Local feature extraction methods in traditional SLAM systems often do not provide consistent results in the presence of motion blur or scale changes. As traditional SLAM systems do not incorporate learning (i.e., training of parameter values) they suffer from the well-known problems of heuristic systems, such as working well in test environments but encountering difficulty when faced with real-world variability. However, even systems that incorporate learning suffer from issues. Deep learning or dense SLAM systems often require textured scenes, as high frequency pixel changes are needed to allow different images to be compared for tracking. Deep learning or dense SLAM systems also require smooth sensor movements, as abrupt changes lead to discontinuities and issues in optimisation processes. Deep learning SLAM systems also require re-training in different environments, are difficult to generalise, and often lack a strong theoretical grounding. Dense SLAM systems build very complex three-dimensional volumetric or point cloud maps of a three-dimensional space, with millions of defined points. These maps result in complex projections and point models often appear patchy and ethereal. They also lead to very large three-dimensional models (e.g., even a small model of a space may be gigabytes in size). This means that visualisations of dense maps are typically generated off-line in rendering procedures that can take hours or even days to complete. All SLAM systems also tend to be sensitive to changes in lighting, e.g. they struggle when navigating a space at different times of day.

There is thus a desire for improved SLAM systems that allow an environment to be mapped and for navigating devices to be located within maps. Systems and methods are desired that overcome the dramatic failures that can occur when comparative SLAM systems have a poor understanding of the environment, e.g. due to a lack of texture, non-optimal lighting conditions or jerky camera motion. This in turn may allow more advanced autonomous exploration of environments and better fusing of virtual and physical worlds for virtual and augmented reality applications.

SUMMARY OF THE INVENTION

Aspects of the present invention are set out in the appended independent claims. Variations of the present invention are set out in the appended dependent claims. Other unclaimed examples and variations of the present invention are set out in the detailed description below.

BRIEF DESCRIPTION OF THE DRAWINGS

Examples of the invention will now be described, by way of example only, with reference to the accompanying drawings, in which.

DETAILED DESCRIPTION

Introduction

Figure 1A:
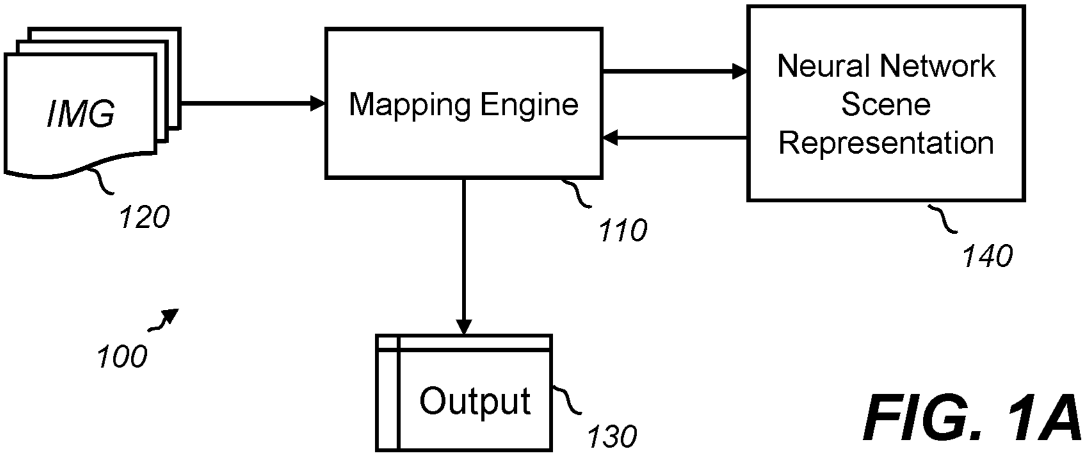
FIG. 1A is a schematic illustration of an example mapping system according to a first embodiment.

The present invention provides approaches for using a neural network scene representation as a three-dimensional map within a wider mapping system, such as the "mapping" element of a SLAM system. In these examples, the neural network scene representation comprises a neural network architecture (e.g., a multi-layer neural network) that is configured to map at least point locations in three-dimensional (3D) space to scene feature tensors, i.e. arrays with a dimensionality or element length that is greater than the input dimensionality or length (e.g., from 3-5 elements to 128-512 elements). This represents a new way of implementing a mapping system: the "map" is stored at least partly in the parameters (e.g., weights and biases) of a neural network architecture rather than as an explicit set of points in three dimensions. The neural network scene representation thus acts as a look-up for point properties. This is closer to a more biologically plausible representation of the properties of a space or environment. For example, the scene feature tensors may in turn be mapped to properties such as filled or empty space (e.g., Boolean space occupation), point colour (e.g., in Red, Green, Blue—RGB—or YUV colour spaces), transparency (e.g., for materials that allow the transmission of light), object classifications etc. The neural network scene representation may thus be used as a differentiable plug-in mapping component for the wider mapping or SLAM system.

Many comparative SLAM systems generate a projection of a 3D point cloud onto an image plane defined by an associated camera pose for a particular point in time. This typically involves traditional ray casting from the image plane to a first (i.e., occupied) point in the 3D point cloud. The point in the 3D point cloud may be represented as a set of data (e.g., point colour, point properties) that is indexed by the point coordinate (e.g., in a look-up table). The 3D point cloud is often stored as a large list of 3D points and their properties. The ray casting may be repeated for each colour component to generate a complete image. The resulting projected images are then used to determine photometric errors that form part of pose and/or point optimisation. In this case, the 3D point cloud is a discrete, non-differentiable space (e.g., it is not possible to differentiate a look-up table). However, when using a neural network scene representation, the same operation may be configured as a differentiable function that uses the neural network architecture in an inference mode. As such it becomes possible to optimise both the map of the environment and other mapping functions, such as visual odometry or image feature selection, or to iteratively optimise parameters for both the map and the wider system. For example, errors may be propagated back through the neural network scene representation (which may have either fixed or trainable parameters) using gradients computed along the compute graph that includes the neural network scene representation. This then allows a complete end-to-end learning system and allows other mapping functions or SLAM modules to query the whole mapping space, e.g. providing "super-dense" functionality while avoiding the need for explicit storage of 3D point data—the information describing the scene is embodied in the parameters of the neural network architecture. It also means that other trainable components of the mapping system, such as feature extractors that are applied to images, or pose optimisation procedures, may be trained to have parameters that are optimised for the neural network scene optimisation, i.e. the trained parameters provide not only an improvement over hand-crafted functions but also provide improved synergistic performance when used with the neural network scene optimisation.

Several different implementations of a neural network scene representation within a wider mapping or SLAM system are envisaged. These are set out as different embodiments in the description below, but it should be appreciated that features from one embodiment may be readily combined with features from another embodiment; any incompatibilities between embodiments will be explicitly indicated, and absent of any such indication, it is to be assumed that components are compatible, may be readily exchanged, and description for one embodiment may also apply to corresponding or similar features in other embodiments.

In one case, the neural network scene representation may be configured as a plug-in mapping module for a known or new differentiable mapping engine such as known SLAM systems. Hence, a SLAM system with an efficient mapping method may be upgraded with new SLAM modules as new approaches are developed, including those involving deep learning modules.

In one case, the neural network scene representation may be used together with an image feature extractor such as a front-end CNN architecture that is applied to captured frames of video data. In this case, parameter values for the neural network scene representation may be fixed (e.g., based on previously captured images of the scene during a "mapping" phase) but gradients may still be determined along the compute graph and be used to update the parameters of the image feature extractor. Hence, the image feature extractor learns to extract image features that may be used to track a camera from image to image, e.g. for sparse SLAM, and that work optimally with the neural network scene representation. This is not possible with comparative image feature extractor for SLAM systems, which are typically trained using pairs of input images and features, as the mapping elements are treated as separate non-differentiable modules. The present invention thus provides a way to perform semi or even unsupervised learning, for example different SLAM modules may be trained just using training data that comprises images and known poses.

In one implementation, the present invention may be used in a wider mapping system to generate views of a mapped space. For example, novel views of a scene may be generated by providing a new or synthetic pose to the neural network scene representation. In another case, a 3D model, such as an information model defined with a 3D coordinate system, may be converted into a set of parameters for the neural network scene representation, e.g. by generating views of the 3D model with known poses or by the generation of training data from the 3D model that maps 3D point coordinates to model data (such as occupancy or colour). These two approaches may also be combined, e.g. a 3D model may be converted into a set of parameters for the neural network scene representation and the neural network scene representation may then be used to generate views of the 3D model. For example, this may be used to determine trained parameters for the neural network scene representation from a provided Building Information Model (BIM). The approaches may also have a synergetic affect when the neural network scene representation is also used as part of a SLAM system—the 3D model in effect becomes a differentiable part of the SLAM system and so errors may be backpropagated through the neural representation of the 3D model, allowing learning to take into account properties of the 3D model and optimise accordingly. For example, if the 3D model is an interior space, components of the SLAM system may show improved performance for the interior space. Furthermore, different modules may be added to use the neural network scene representation for inference, e.g. in relation to semantic information relating to a scene, such as the classification or labelling of objects within the environment. For example, a small neural network architecture, such as a multilayer perceptron or fully-connected network, may receive the scene feature tensors associated with points used to determine values for one or more pixels in a view generated by the neural network scene representation and may be trained to map these scene feature tensors to object classifications. Rather than requiring a redesign of the complete SLAM system, the new small neural network architecture may simply be "wired" into an existing differentiable SLAM system with the neural network scene representation and the whole system may be trained with training data that comprises input images and object classifications, the latter being compared to the output of the small neural network architecture. The whole system may be trained with fixed parameters for the other modules (including the neural network scene representation)—i.e. so these other modules are not updated—or with selected modules having learnable parameters—i.e. so these modules may adapt their output based on the object classification. In certain cases, when the parameters are not fixed, different learning rates and hyper-parameters may be applied, e.g. a smaller learning rate may allow only small updates to the parameters of other modules to avoid catastrophic forgetting of previously learning local extrema.

The present invention thus provides an improvement to comparative mapping and SLAM approaches. The neural network scene representation allows a more comprehensive understanding of the 3D environment that is mapped, as the high-dimensionality scene feature tensors for each addressable point in the mapped space comprise a learnt representation of scene properties. Moreover, using a neural network scene representation has been found to allow invariance to lighting conditions, e.g. the scene feature tensors are found to be a lighting invariant representation that nevertheless comprise information that allows further small neural network architectures (e.g., comprising a few fully-connected layers) to map the scene feature tensors and viewing/lighting information to lighting-dependent colour component values. It has also been found to allow robustness against textureless scenes as the neural network scene representation learns a function that is a smooth mapping of the environment as such the mapping is not reliant on individual points and properties between points may be determined by interpolating between input and/or output data (which effectively also interpolates between output properties as represented in the high-dimensionality scene feature tensors).

Neural network scene representations also have the surprising property that a function that represents properties of a space or environment can be captured using a set of parameters whose size is much smaller than comparative point cloud representations. For example, an 8-12 layer fully-connected neural network architecture with 256-512 channels and floating point weights may have need a small number of megabytes of space to store parameters, compared to point cloud models where even a small volume requires many point definitions and their accompanying properties (e.g. typically gigabytes). This surprisingly effect comes about because the neural network scene representation learns to see the environment as a complex function not as discrete independent points, and so the fitted function may be much more compactly represented than the data points themselves. For example, many spaces can be approximately represented fairly well with low parameter, low frequency models (think large objects, walls, trees etc) that are then adjusted (e.g., within the learnt function) by small higher frequency corrections. In comparison, typical point cloud representations seek to build a model of a space using only high-resolution high frequency features (e.g., imagine defining a wall using individual points at a millimetre level). In mapping, the present examples with small parameter "maps" offer many advantages, e.g. maps of an environment can be transmitted to remote devices with limited battery power and/or network bandwidth and can also be exchanged easily between devices. Efficient example methods that may be used to compare and share parameters for neural network scene representations are presented later herein.

Certain Term Definitions

Where applicable, terms used herein are to be defined as per the art (e.g. computer vision, robotic mapping and/or SLAM). To ease interpretation of the following examples, explanations and definitions of certain specific terms are provided below.

The term "mapping system" is used to refer to a system of components for performing computations relating to a physical environment. A "mapping system" may form part of a "tracking system", where the term "tracking" refers to the repeated or iterative determining of one or more of location and orientation over time. A "mapping system" may comprise, or form part of, a SLAM system, i.e. form the M of SLAM; however, it may also be used without explicit localisation, e.g. to return properties of an environment and/or to construct virtual views of the environment. In preferred examples, the mapping system provides a representation of the environment and allows a position and orientation of an object within that environment to be determined, e.g. where the object comprises one or more sensor devices such as cameras that capture measurements of the space.

The term "pose" is used herein to refer to a location and orientation of an object. For example, a pose may comprise a coordinate specifying a location with reference to a coordinate system and a set of angles representing orientation of a plane associated with the object within the coordinate system. The plane may, for example, be aligned with a defined face of the object or a particular location on the object. In other cases, a pose may be defined by a plurality of coordinates specifying a respective plurality of locations with reference to the coordinate system, thus allowing an orientation of a rigid body encompassing the points to be determined. For a rigid object, the location may be defined with respect to a particular point on the object. In one case, a pose may be efficiently represented using quaternion coordinates. A pose may specify the location and orientation of an object with regard to one or more degrees of freedom within the coordinate system. For example, an object may comprise a rigid body with three or six degrees of freedom. Three degrees of freedom may be defined in relation to translation with respect to each axis in 3D space, whereas six degrees of freedom may add a rotational component with respect to each axis. In examples herein relating to an object that is exploring an environment, the pose may comprise the location and orientation of a defined point on the object.

The term "object" is used broadly to refer to any technical system that may navigate a space. It may include a human being equipped with a device to capture image data, such as an augmented reality headset or a mobile phone, and/or autonomous or semi-autonomous devices such as drones, vehicles, robots etc.

The term "engine" is used herein to refer to either hardware structure that has a specific function (e.g., in the form of mapping input data to output data) or a combination of general hardware and specific software (e.g., specific computer program code that is executed on one or more general purpose processors). An "engine" as described herein may be implemented as a specific packaged chipset, for example, an Application Specific Integrated Circuit (ASIC) or a programmed Field Programmable Gate Array (FPGA), and/or as a software object, class, class instance, script, code portion or the like, as executed in use by a processor. For example, the term "mapping engine" is used to refer to an engine that provides one or more mapping functions with respect to an environment. These mapping functions may comprise C or C++ programs that are executed by one or more embedded processors in a robotic device.

The term "camera" is used broadly to cover any camera device with one or more channels that is configured to capture one or more images. A camera may comprise a static or video camera. A video camera may comprise a camera that outputs a series of images as image data over time, such as a series of frames that constitute a "video" signal. It should be noted that any still camera may also be used to implement a video camera function if it is capable of outputting successive images over time. A camera may obtain image information according to any known colour and/or channel representation, including greyscale cameras, Red-Green-Blue (RGB) cameras and/or RGB and Depth (RGB-D) cameras. Cameras may comprise single monocular cameras or a plurality of stereo cameras. In certain cases, a camera may comprise one or more event cameras and/or one or more lidar sensors (i.e., laser-based distance sensors). An event camera is known in the art as an imaging sensor that responds to local changes in brightness, wherein pixels may asynchronously report changes in brightness as they occur, mimicking more human-like vision properties. The choice of camera may vary between implementations and positioning systems. Resolutions and frame rates may be selected so as to achieve a desired capability according to the requirements of the mapping system.

The term "image data" covers any representation of a captured measurement of an environment. Image data may be provided and manipulated in the form of a multidimensional array (e.g., two spatial dimensions and one or more intensity channels). Image data may represent a frame of video data. As is known in the art, acquired or "raw" image data may be pre-processed by camera hardware and/or software pre-processing functionality prior to use by any mapping system described herein. An advantage of neural network architectures is that they may be configured to different input formats via training and so may be trained on different input formats depending on the specific implementation. Image data may be provided in any known colour space, including but not limited to RGB, YUV, LAB etc.

The term "neural network scene representation" is used to describe a neural network architecture where properties of an environment are encapsulated within the parameter values of the neural network layers that form the neural network architecture. For example, a neural network scene representation may comprise a neural network architecture with a plurality of neural network layers in series (a so-called deep neural network), where the neural network architecture receives a representation of position and/or orientation as input and is trained to map this to a higher dimensionality representation, such as an output array of one or more dimensions (often referred to in the art as a "tensor") where the number of elements (e.g., vector or array length) is greater than the number of input elements that are used in the representation of position and/or orientation. In certain cases, a vector of length mD may form the input to the neural network scene representation and a vector of length nD may form the output to the neural network scene representation, where n>m (and preferably n>>m). For example, m may be 3-6, or at least less than 50, and n may be 128-512, or at least double m. In certain cases, an original input tensor representing one or more of position and orientation may be pre-processed by mapping the input tensor to a positional embedding or encoding that has a greater dimensionality (e.g., vector length) than the input tensor but that is still smaller than the output tensor. In certain cases, a neural network scene representation may comprise, or be based on, a neural radiance field neural network. An example of a neural radiance field neural network is provided in the paper "NeRF: Representing Scenes as Neural Radiance Fields for View Synthesis" by Ben Mildenhall et al, ECCV 2020, which is incorporated herein by reference. Other neural network scene representations include neural volumes such as those described by Lombardi et al in the paper "Neural volumes: Learning dynamic renderable volumes from images", ACM Transactions on Graphics (SIGGRAPH) (2019), scene representation networks such as those described by Sitzmann et al in "Scene representation networks: Continuous 3D-structure-aware neural scene representations", NeurIPS (2019), and local light field fusion networks such as those described by Ben Mildenhall et al in the paper "Local light field fusion: Practical view synthesis with prescriptive sampling guidelines", published in ACM Transactions on Graphics (SIGGRAPH) (2019), all of these papers being incorporated by reference herein.

The term "neural network architecture" refers to a set of one or more artificial neural networks that are configured to perform a particular data processing task. For example, a "neural network architecture" may comprise a particular arrangement of one or more neural network layers of one or more neural network types. Neural network types include convolutional neural networks, recurrent neural networks and feed-forward neural networks. Convolutional neural networks involve the application of one or more convolution operations. Recurrent neural networks involve an internal state that is updated during a sequence of inputs. Feed-forward neural networks involve transformation operations with no feedback, e.g. operations are applied in a one-way sequence from input to output. Feed-forward neural networks are sometimes referred to as plain "neural networks", "fully-connected" neural networks, multilayer perceptrons or "dense", "linear", or "deep" neural networks (the latter when they comprise multiple neural network layers in series).

A "neural network layer", as typically defined within machine learning programming tools and libraries, may be considered an operation that maps input data to output data. A "neural network layer" may apply one or more weights to map input data to output data. One or more bias terms may also be applied. The weights and biases of a neural network layer may be applied using one or more multidimensional arrays or matrices. A neural network layer may be implemented via a matrix multiplication to provide a linear transformation. In general, a neural network layer has a plurality of parameters whose value influence how input data is mapped to output data by the layer. These parameters may be trained in a supervised manner by optimizing an objective function. This typically involves minimizing a loss function. A convolutional neural network layer may apply a specified convolution operation. A feed-forward neural network layer may apply one or more of a set of weights and biases to input data to generate output data. This operation may be represented as a matrix operation (e.g., where a bias term may be included by appending a value of 1 onto input data). Alternatively, a bias may be applied through a separate addition operation.

To model complex non-linear functions, a neural network layer as described above may be followed by a non-linear activation function. Common activation functions include the sigmoid function, the tanh function, and Rectified Linear Units (RELUs). Many other activation functions exist and may be applied. A softmax activation may be applied to convert a set of logits or scores into a set of probability values that sum to 1. An activation function may be selected based on testing and preference. Activation functions may be omitted in certain circumstances, and/or form part of the internal structure of a neural network layer. Neural network layers including an output activation function may be stacked as is known in the art to generate "deep" neural network architectures.

The examples of mapping systems as described herein, including sub-components of that mapping system such as feature extractors and/or neural network scene representations, may be configured to be trained using an approach called backpropagation. A training set is supplied that consists of pairs of input and output data. A plurality of neural network architectures, such as those described in the examples below, may be communicatively coupled to form a compute graph, wherein the mapping system may be trained as a whole (sometimes referred to as "end-to-end" training). The output data is often called "ground truth" data as it represents what the output should be. During back-propagation, the neural network layers that make up each neural network architecture are initialized (e.g., with randomized weights) and then used to make a prediction using a set of input data from the training set (e.g., a so-called "forward" pass). The prediction is compared with the corresponding "ground truth" output data from the training set and an error is computed. The error may form part of a loss function. If gradient descent methods are used, the error is used to determine a gradient of the loss function with respect to the parameters of the mapping system (or one or more sub-components), where the gradient is then used to back propagate an update to the parameter values through the plurality of neural network architectures. Typically, the update is propagated according to the derivative of the weights of the neural network layers. For example, a gradient of the loss function with respect to the weights of the neural network layers may be determined and used to determine an update to the weights that minimizes the loss function. In this case, optimization techniques such as gradient descent, stochastic gradient descent, Adam etc. may be used to adjust the weights. The chain rule and auto-differentiation functions may be applied to efficiently compute the gradient of the loss function, e.g. starting from the output of the mapping system or a specific component and working back through the neural network layers of each neural network architecture in turn.

Following conventions in the art, the configuration of one or more neural network layers (e.g., as part of a wider neural network architecture) is referred to herein as "training", and application of the one or more neural networks to generate an output without adjustment of parameters is referred to as "inference". Reference to the "training" of "parameters" should be taken as reference to the determination of values for parameters such as neural network weights (and biases if separate) based on training operations such as those described above.

Certain examples described herein relate to the generation of a "synthetic" or "simulated" view of an environment. The terms "synthetic" and "simulated" are used as synonyms herein, together with the term "virtual", to refer to data that is generated based on an output of one or more neural network architectures as opposed to direct measurement, e.g. as opposed to images obtained using light from the environment that hits a charge-coupled device.

Example of Mapping Using a Neural Network Scene Representation

Figure 1B:
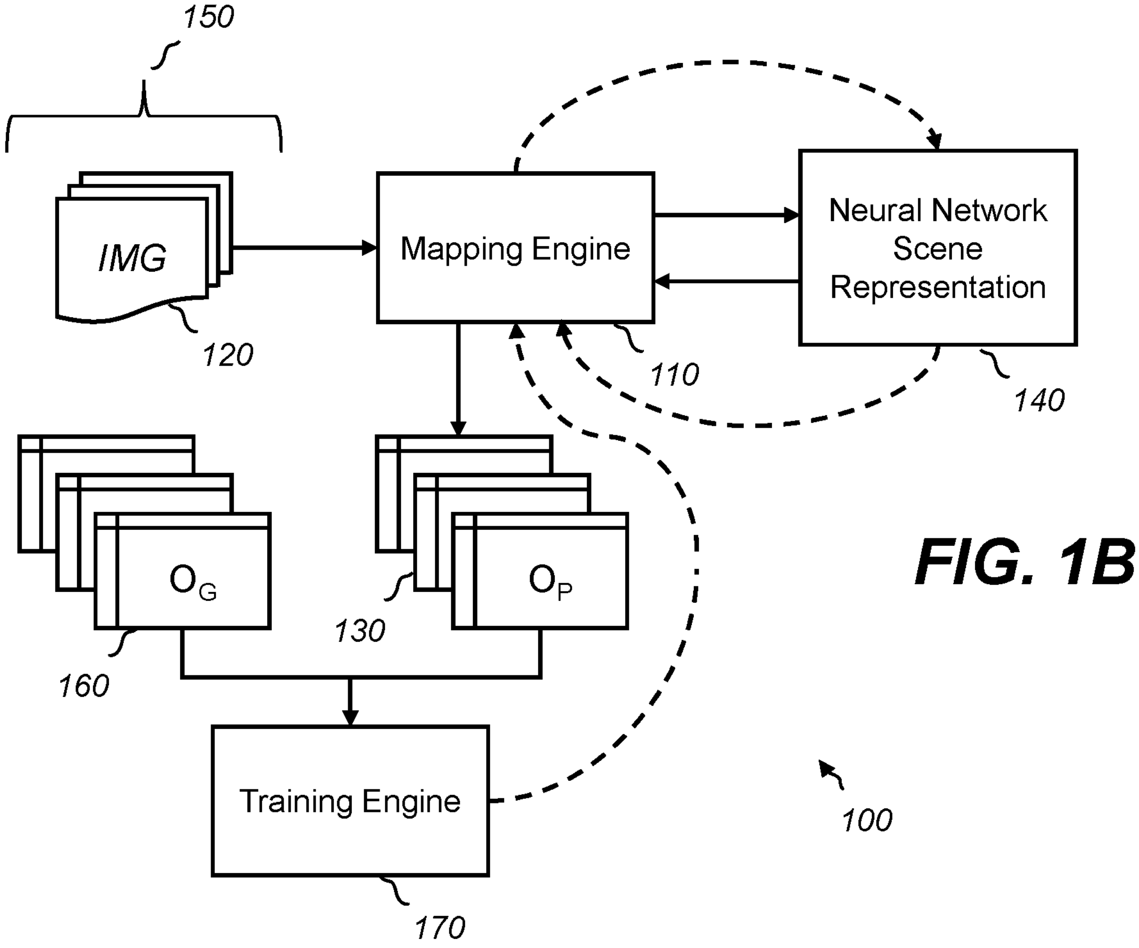
FIG. 1B is a schematic illustration showing a training operation for the example mapping system of FIG. 1A.

FIGS. 1A and 1B show a first embodiment of an example mapping system 100 in respective inference and training modes. The mapping system 100 comprises a mapping engine 110 that receives image data 120 and generates a mapping output 130. The image data 120 may comprise one or more images, such as frames from captured video data. The image data 120 may comprise image data as defined above. The mapping output 130 may comprise data to help an object navigate an environment. For example, the mapping output 130 may comprise one or more poses of a camera used to capture the image data 120 (or a rigidly coupled object), including a current estimated pose based on a most recent image provided to the mapping engine 110. In certain cases, the mapping engine 110 may comprise, or form part of, a SLAM system. In other cases, the mapping engine 110 may implement mapping functionality that does not include localisation. For example, the mapping output 130 may comprise a location vector representing the probability of a most recent image in the image data 120 being captured in a particular known location, such as a place recognition output. The inputs to the mapping engine 110 shown in FIGS. 1A and/or 1B are not exhaustive, in certain cases the mapping engine 110 may receive other data in addition to the image data 120, such as a desired viewing direction. In this latter case, the mapping engine 110 may generate a synthetic view of an environment as the mapping output 130, e.g. where the image data 120 is used to generate a map of the environment. The mapping engine 130 may form part of a computing device, such as a smartphone that is being used to explore an environment, or comprise part of an embedded navigation system for an autonomous device.

In the examples of FIGS. 1A and 1B, the mapping engine 110 is communicatively coupled to a neural network scene representation 140. This may comprise a local or remote coupling (e.g., the latter may be used for a distributed implementation). The mapping engine 110 is configured to request feature information for locations within the environment, e.g. a request may include an indication of 3D coordinates in a frame of reference associated with the environment that has a defined origin (which may be an initial position of the camera providing the image data 120). The neural network scene representation 140 comprises a neural network architecture configured to map locations within the environment to scene feature tensors. These scene feature tensors may comprise nD arrays of elements (where n is a selectable hyperparameter, for example, 128, 256 or 512). In one case, the neural network scene representation 140 may map at least a 3D coordinate representing a point in the environment to a scene feature tensor. In another case, the neural network scene representation 140 may map another form of input coordinate, such as a 4D quaternion.

The mapping engine 110 may be configured to make multiple requests for an output of the neural network scene representation 140. For example, the mapping engine 110 may operate based on a projected view of a map of the environment, where the projected view is associated with an image plane defined by a pose. In this case, the mapping engine 110 may determine point locations that are viewable from the image plane, e.g. for each pixel tracing a normal viewing ray in three-dimensions where points are sampled along the ray, and the coordinates of these points may then form the input for the neural network scene representation 140. The mapping engine 110 may then, over a series of iterations, receive a plurality of scene feature tensors associated with each traced ray and use these to determine a property associated with a corresponding location in the image plane (e.g., an RGB and transparency value of each sampled point on the ray, which may then be integrated using known ray casting methods to determine a pixel value).

FIG. 1B shows how the mapping system 100 may be trained in a training mode. As the neural network scene representation comprises a neural network architecture it may be differentiated as part of a compute graph (e.g., using the chain rule). Similarly, in preferred embodiments, the mapping engine 110 also comprises a differentiable architecture, e.g. a series of coupled functions that form a compute graph where each function is differentiable. For example, the mapping engine 110 may comprise one or more continuous functions or one or more neural network architectures. For complex operations, the mapping engine 110 may comprise multiple communicatively coupled differentiable functions. Examples of differentiable mapping functions are described, for example, in the paper "GradSLAM: Automagically differentiable SLAM" by Krishna Murthy J. et al (published on arXiv on 19 Nov. 2020).

In FIG. 1B, as both the mapping engine 110 and the neural network scene representation 140 are differentiable, the combined mapping system 100 may be trained as a whole (often referred to as end-to-end training). Training is performed using training data 150. In this example, the training data 150 comprises image data 120 and ground-truth mapping outputs 160. During training, the mapping engine 110 and the neural network scene representation 140 are applied as shown in FIG. 1A to produce a predicted or estimated mapping output 130. A training engine 170 oversees the training and evaluates an optimisation function that compares the predicted mapping output 130 with the ground-truth mapping output 160 for a particular training sample. This optimisation function is differentiated (e.g., using known automated differentiation programming libraries) with respect to the parameter values of one or more of the mapping engine 110 and the scene neural network representation 140. The differential is then used to determine a gradient to optimise the optimisation function (typically a direction that minimises a loss function). The gradient may then be used to adjust the parameters of one or more of the mapping engine 110 and the neural network scene representation 140, e.g. using an approach such as stochastic gradient descent. Backpropagation uses the chain rule applied along the compute graph to efficiently adjust the parameters in different components of the mapping system 100 (e.g., in different neural network layers of one or more neural network architectures). This is illustrated schematically with the dashed lines in FIG. 1B, where the weights are optimised starting with the output in reverse computation order (i.e., in a way that propagates backwards through the compute graph).

Depending on the training procedure just one or both of the mapping engine 110 and the neural network scene representation 140 may be trained at one time. For example, in certain cases it may be desired to only train one of these components, in which case, the parameters for the non-trained component are fixed and training is performed as shown in FIG. 1B but assuming the fixed parameters are constants. In one implementation both the mapping engine 110 and the neural network scene representation 140 may be trained. This is a case where it is desired to both train the mapping engine 110 and build a map of the environment represented within the training data 150. In other cases, though, it may be desired to train the mapping engine 110 using a fixed pre-trained neural network scene representation 140, i.e. representing a previous mapping of a known environment. For example, if the training data 150 comprised images and known poses of an explored scene (such as an office, room or outdoor space), then a separately trained set of parameters for the neural network scene representation 140 may be used representing a pre-obtained map of the explored scene. Similarly, where in a mapping phase, it may be desired to fix (i.e. freeze) the parameters of the mapping engine 110 so as to learn parameters for the neural network scene representation 140 that represent a map of the scene.

Example of SLAM Using a Neural Network Scene Representation

Figure 2A:
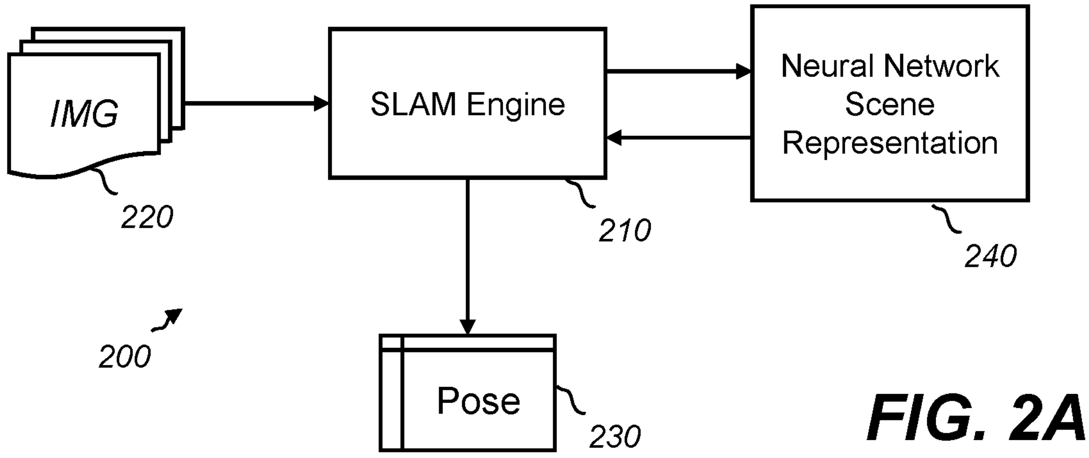
FIG. 2A is a schematic illustration of an example mapping system according to a second embodiment.
Figure 2B:
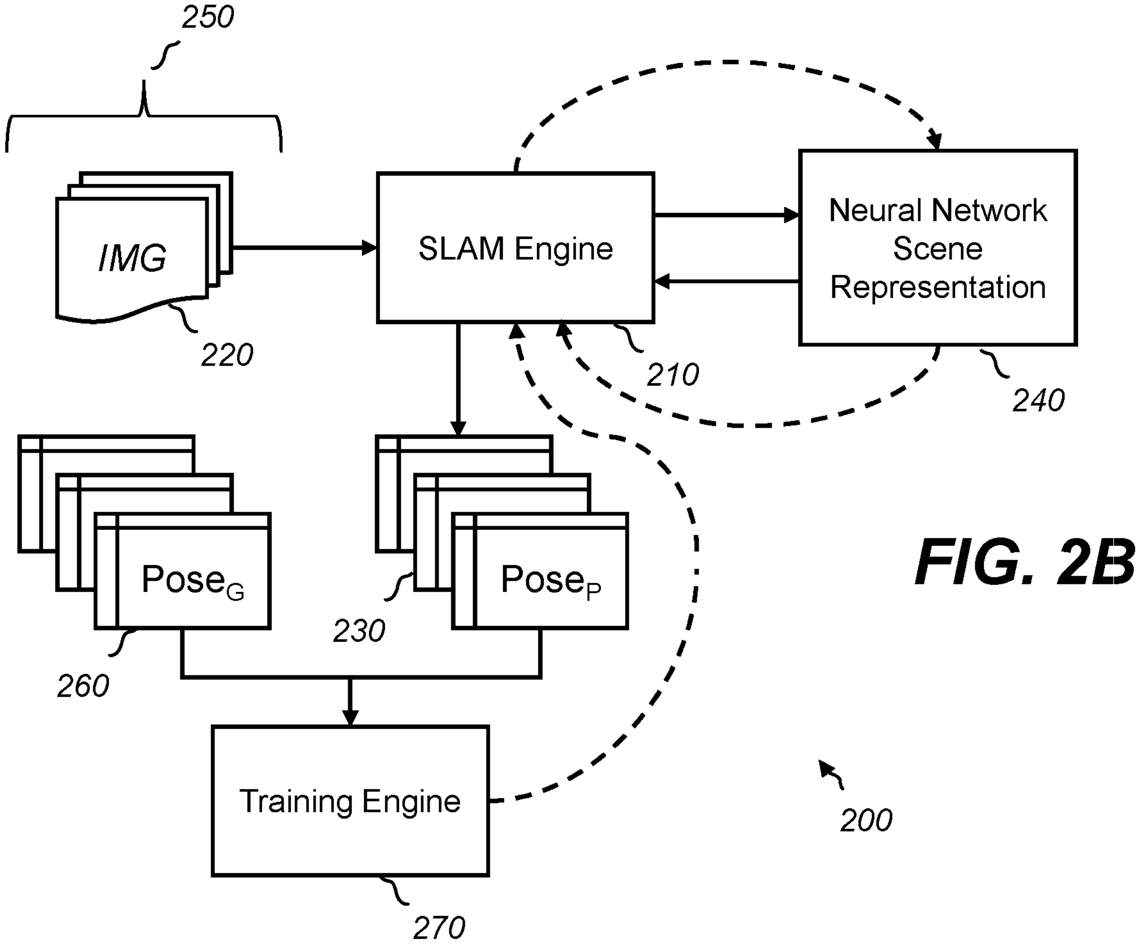
FIG. 2B is a schematic illustration showing a training operation for the example mapping system of FIG. 2A.

FIGS. 2A and 2B show a second embodiment that may be considered as a variation of the schematic configurations of FIGS. 1A and 1B. Similar components are labelled with similar reference numerals (e.g., with the prefix 1xx replaced with 2xx). In this variation the mapping system 100 is a SLAM system 200. As per FIGS. 1A and 1B, FIGS. 2A and 2B respectively show the SLAM system 200 in an inference mode and a training mode. In this example, the mapping engine 110 is replaced with a differentiable SLAM engine 210. The differentiable SLAM engine 210 may comprise any known or new SLAM architecture with at least one differentiable component. In the present example, the SLAM system 200 receives image data 220 and outputs one or more poses 230. In one case, the image data 220 may comprise frames captured over time from one or more cameras. The one or more poses 230 may comprise a location and orientation of the one or more cameras with respect to a 3D coordinate system used by the SLAM system 200, e.g. may comprise a 6 degrees of freedom (6DOF) pose. In other cases, the one or more poses 230 may comprise one or more of location and orientation within a coordinate system with one or more degrees of freedom. In certain cases, the pose may be represented with a quaternion coordinate. In one case, the differentiable SLAM engine 210 receives frames of image data 220 over time and outputs corresponding poses 230 over time, e.g. such that at time t, the differentiable SLAM engine 210 outputs pose, representing the estimated pose of a camera at that time. In one case, the differentiable tracking engine 210 may output a sequence of poses 230 over time, wherein the sequence of poses 230 may be continually optimised as more image data 220 is obtained (e.g., as more frames are input into the SLAM engine 210).

In FIGS. 2A and 2B, the differentiable SLAM engine 210 uses the neural network scene representation 140 as a mapping of the environment during operation of the differentiable SLAM engine 210, i.e. as the M in SLAM. For example, the neural network scene representation 140 is used as a replacement for a previous conventional map, such as a 3D point cloud or surfel (surface element) map of an environment in which an object (e.g., the camera) is tracked. The neural network scene representation 140 may either be used as a fixed map (e.g., with fixed parameter values) or as an updatable map (e.g., with trainable or otherwise updatable parameter values).

FIG. 2B shows a training mode as per FIG. 1B. Here, the training data 250 comprises image data 220 and ground-truth pose data 260, where the ground-truth pose data 260 is compared with estimated or predicted pose data 230 by a training engine 270, which in turn uses gradient descent and backpropagation to update parameters of one or more of the differentiable SLAM engine 210 and the neural network scene representation 240. As above, these two components may be trained at the same time or individually.

In one case, the training mode of FIG. 2B is performed during navigation of an environment for semi-supervised training. For example, both the differentiable tracking engine 210 and the neural network scene representation 240 may be trained together offline using a large body of training data 250 representing multiple environments. The differentiable tracking engine 210 and the neural network scene representation 240 may thus learn a set of generally applicable parameters for different environments. During use in a particular environment, limited learning may be configured so as to update the general parameters to specific values for the particular environment (e.g., a form of "transfer" learning). In one case, only the neural network scene representation 240 may be updated to learn a more specific representation of a particular environment. Learning hyperparameters, such as learning rate, may be controlled so as to reduce the size of the parameters updates performed during online learning. This reduces the risk of catastrophic forgetting of useful parameters for scene mapping (e.g., as local minima are lost). In one case, pre-training may be selectively performed for different environments, for example, internal vs external environments, or different room types and different initial parameter sets for the neural network scene representation 240 may be loaded based on an environment of use (e.g., as selected by a user or determined via place recognition as described later).

Figure 2C:
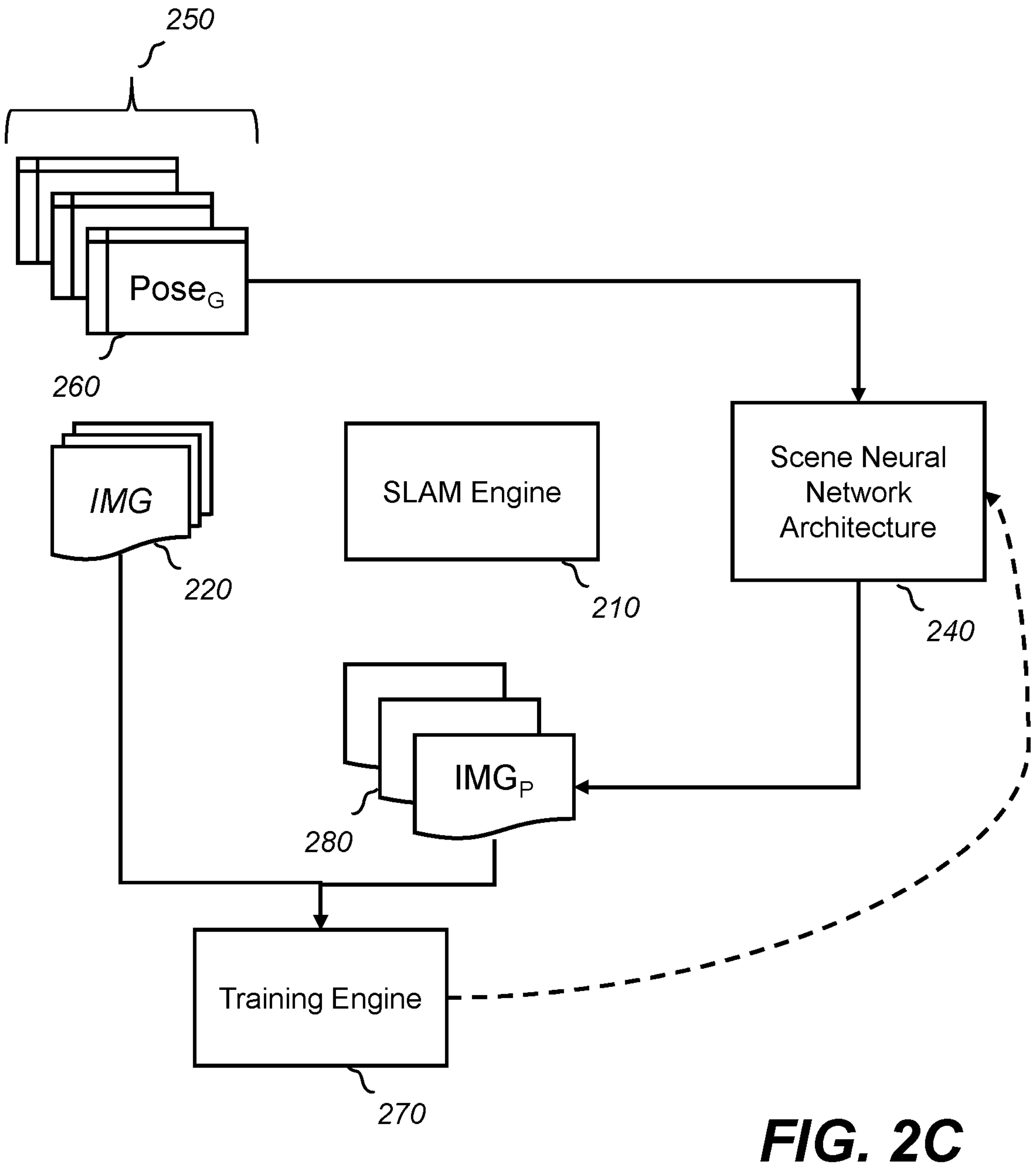
FIG. 2C is a schematic illustration showing a further training operation for the example mapping system of FIG. 2A.

FIG. 2C shows a variation of the training modes of FIGS. 1B and 2B, wherein only the neural network scene representation 240 is trained. For example, this may comprise a "mapping only" mode of training, wherein only the parameters of the neural network scene representation 240 are updated. Both the training modes shown in FIGS. 2B and 2C may be available for the mapping system 200 and may be used in different circumstances.

In FIG. 2C, the training data 250 again comprises image data 220 and pose data 260, e.g, wherein frames of image data 220 may be paired with particular camera poses during a recorded navigation of an environment. However, in FIG. 2C, the pose data 260 is used as the input for the neural network scene representation 240, and the neural network scene representation 240 is arranged to output predicted image data 280 representing an inferred or predicted view of the environment being mapped as viewed according to an input pose. In this case, the training engine 270 is configured to evaluate a loss function based on a difference between the predicted image data 280 and the original image data 220 from the training set 250 and update the parameters of the neural network scene representation 240 (e.g., using backpropagation and gradient descent as described above). In this manner, the neural network scene representation 240 is trained individually to represent an environment that is explored and features in the original image data 220. Once trained the neural network scene representation 240 may then be used to predict synthetic views of the environment from a provided input pose. The example of FIG. 2C may be used in cases where the SLAM engine 210 (or any general mapping engine such as 110) is not differentiable, or may represent a form of training where any parameters of the SLAM engine 210 are fixed. It should also be noted that a loss function based on image data, as shown in FIG. 2C may also be used when performing end-to-end training as shown in FIG. 2B—in that case the training set may only comprise image data 220 and the loss may be based on actual measured image data and synthetic image data as generated by the neural network scene representation 240. In effect, in this case, the output pose data 230 is internalised within the mapping system 200. This may be preferred in certain implementations for ease of implementation-training may be unsupervised or self-supervised based on an image feed from a video camera exploring the environment.

In certain cases, an object exploring an environment may iterate between the training modes of FIGS. 2B and 2C. For example, during one portion of the exploration, parameters of the neural network scene representation 240 may be fixed and the parameters of the SLAM engine 210 may be trained as shown in FIG. 2B; then during another portion of the exploration, parameters of the SLAM engine 210 may be fixed and parameters of the neural network scene representation 240 may be trained as shown in FIG. 2C. Also, these different training modes may be configured with different training hyperparameters depending on a state of the exploration. For example, when exploring a new environment, the parameters of the SLAM engine 210 may be updated slowly with a small learning rate value but the parameters of the neural network scene representation 240 may be updated more rapidly using a larger learning rate. For a previously explored environment and/or an already optimised SLAM engine 210, the training mode of FIG. 2C may be applied with a small learning rate.

In the examples above a mapping or SLAM engine represents a trainable architecture that communicates with a neural network scene representation. The trainable architecture may be used for task specific inference (e.g., in relation to navigation and/or augmented/virtual reality—AR/VR—display), for determining point correspondences or for scene semantic querying (e.g., based on an output of the neural network scene representation). In a SLAM case, the trainable architecture may output poses of a tracked object; in a sparse or dense visual odometry case, the trainable architecture may output transformations or correspondences between points or images; in a scene semantic query case, the trainable architecture may output scene segmentation information; and in an AR/VR case, for displaying and/or updating information models used to generate a virtual representation of the environment.

Example Neural Network Scene Representations

Figure 3A:
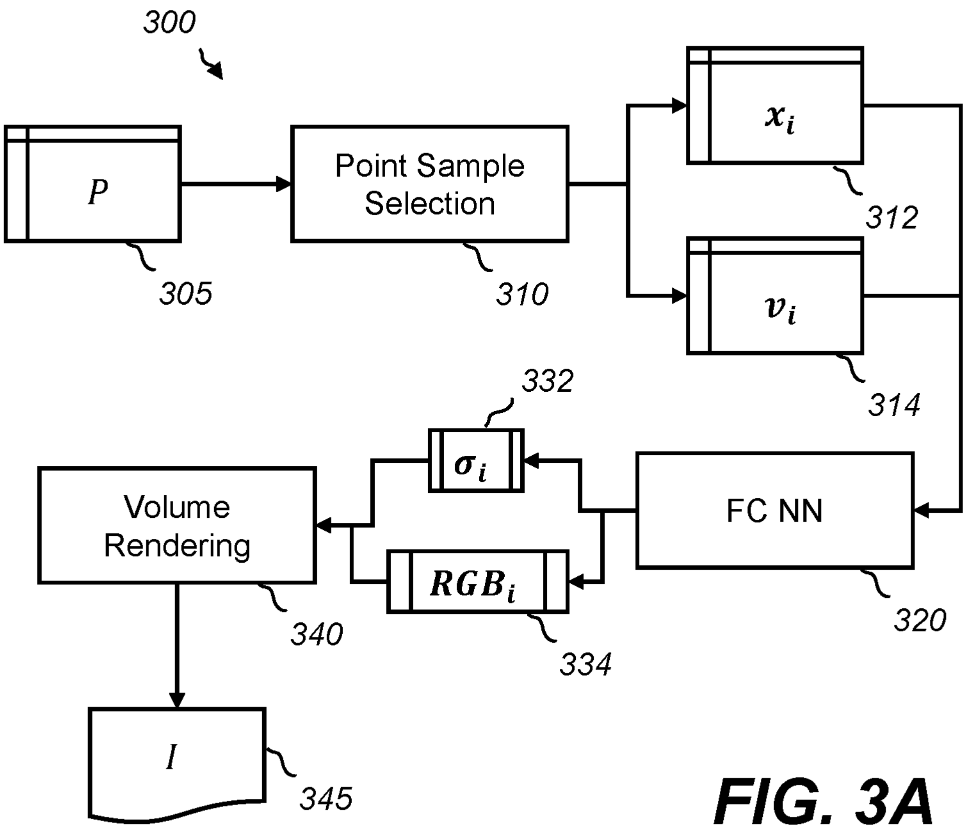
FIG. 3A is schematic illustration showing example components of a neural network scene representation.
Figure 3B:
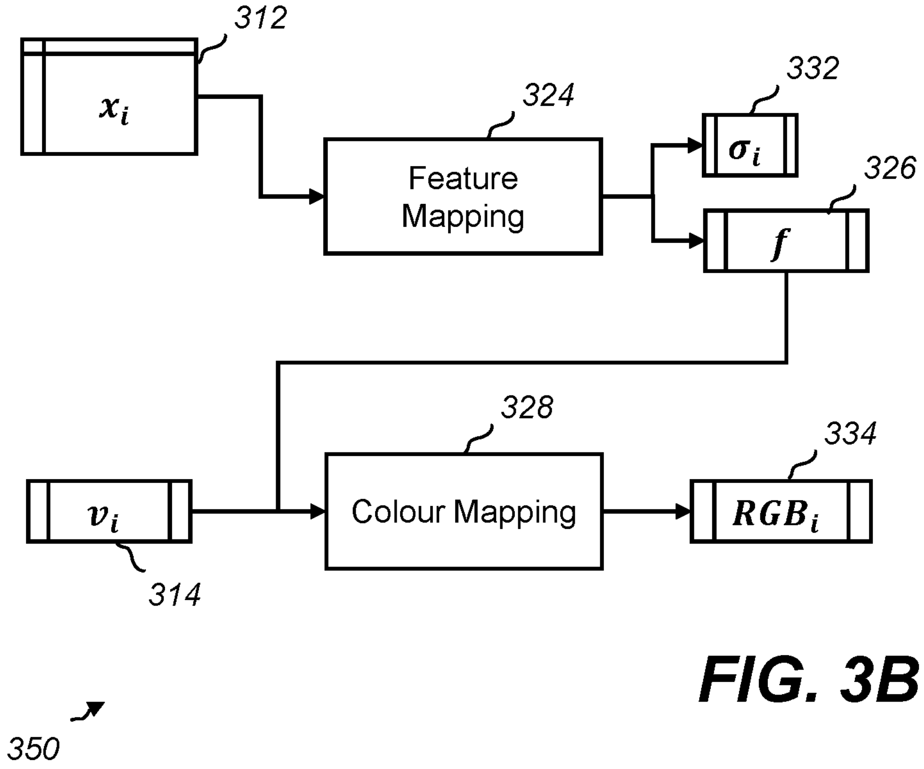
FIG. 3B is a schematic illustration showing how feature and colour mapping may be performed using a neural network scene representation.

FIGS. 3A and 3B show components of a neural network scene representation that may be used with (or as part of) the described embodiments. Similar reference numerals are used in both FIGS. to refer to similar components. FIG. 3A shows an example process 300 for mapping a pose 305 to image data 345. The pose 305 may comprise a pose at a time/as determined by a SLAM engine such as 210 in FIGS. 2A to 2C or a synthetic pose for use as an input to generate a synthetic view.

In FIG. 3A, the pose 305 is provided as input to a point sample selection process 310. This takes the pose 305 and determines a set of sample points. For example, the pose 305 may be indicated with respect to a frame of reference, such as a defined coordinate system, and the point sample selection process 310 may identify locations within the frame of reference that lie upon rays cast based on the pose 305. In one case, the pose 305 may be used to determine an image plane within the frame of reference and rays may be cast from the image plane into the frame of reference, e.g. along normal vectors from each pixel in the image plane. Using geometry, the point sample selection process 310 selects one or more locations along each ray that is cast. This process may apply known ray-casting techniques. In a simple case, locations may be determined using a uniform sampling along the ray based on a defined sampling rate or resolution. In more complex examples, adaptive sampling approaches may be used to improve computational efficiency, e.g. using known statistical sampling approaches.

In general, the point sample selection process 310 takes the pose 305 and outputs sample coordinates 312—$x_i$—and view parameters 314-$v_i$. Each sample coordinate 312 may comprise a 3D coordinate and the view parameters 314 may comprise at least two variables representing a view angle for the 3D coordinate (e.g., representing the geometry of a ray that is viewing the point at the 3D coordinate). In other examples, each data sample output by the point sample selection process 310 may comprise a different format, e.g. a 4D quaternion may be used instead of the separate position and view parameters, only one of data 312 or 314 may be provided, or each data sample may comprise a 6D vector representing a point location and a view vector for the point. There may be a plurality of sample points for each ray and a plurality of rays for each image.

In the example process 300 of FIG. 3A, the sample coordinates 312 and view parameters 314 are received by a fully-connected neural network 320. The fully-connected neural network 320 may comprise a multilayer perceptron. In one case, the fully-connected neural network 320 may comprise eight fully-connected neural network layers with a RELU activation. Each neural network layer may have defined number of output channels (e.g., 256 in test examples) so as to output a tensor of a predefined length (e.g., a vector of 256 elements). In certain cases, skip connections may be included to enhance gradient update, e.g. the input may be added again to a middle (e.g., 5th) neural network layer. The first neural network layer may map from an input tensor size to the defined number of output channels or to a defined or learnt embedding. In certain cases, the defined number of output channels may be kept constant, at least until an output layer. An example implementation may be found in FIG. 7 of the NeRF paper cited above; however, various changes to the number of layers, activation functions and channel sizes may be made based on implementations while maintaining a similar functional mapping.

In FIG. 3A, the fully-connected neural network 320 outputs two variables: a volume density 332 ($\sigma_i$) and an RGB value 334 for the sample point (i). The volume density 332 may comprise a scalar representing a density at the sample coordinate 312. The volume density 332 may be a positive normalised value, e.g. a floating point value from 0 to 1. The volume density 332 may represent, for example, whether the point is solid (e.g. 1), transparent (e.g. 0) or allows light to selectively pass through (e.g. 0.5). A volume density 332 above 0 and below 1 may represent clouds, fog, dust, windows, etc. The volume density 332 may also represent an occupancy of the sample coordinate 312, e.g. a value of 1 may indicate occupancy by an object whereas a value of 0 may represent empty space. The RGB value 334 may comprise a tristimulus value having a defined bit depth, e.g. may comprise 3 elements that are mapped or quantised to a value between 0 and 255. One example of how the RGB value 334 may be generated using the fully-connected neural network 320 is described with reference to FIG. 3B below.

A last operation in the example process 300 of FIG. 3A is a volume rendering operation 340. The volume rendering operation 340 takes one or more sets of volume densities 332 and RGB values 334 that relate to the sample points selected by the point sample selection process 310 and uses these values to render the output image 345. In one case, a pixel value (e.g., an RGB pixel value) for a pixel within an image represented by the aforementioned image plane may be determined by integrating along a cast ray (e.g., a normal ray) and thus integrating a function of the volume densities 332 and RGB values 334. In a digital implementation, integration may comprise summing sample values along the ray. For example, each image may be generated from between 600 and 800 thousand rays with between 64 to 256 sample points per ray. For a reasonably sized 800 by 600 image there may thus be between 150 and 200 million predictions using the fully-connected neural network 320. It may be seen that ray and sample selection may be optimised to reduce a number of predictions and thus speed up the rendering of a synthetic image.

FIG. 3B shows an example 350 of how the RGB value 334 may be predicted by the fully-connected neural network 320. In this example, the fully-connected neural network 320 is split into two portions: a feature mapping portion 324 and a colour mapping portion 328. The feature mapping portion 324 receives as input a sample location 312 in 3D and outputs the volume density 332 and a scene feature tensor 326. It should be noted here that the distinction between the volume density 332 and the scene feature tensor 326 may not exist in practice, e.g. the volume density 332 may comprise an element in the scene feature tensor 326. In certain cases, the volume density 332 may also be omitted as an output of the feature mapping portion 324 but may be predicted based on a further one or more fully-connected neural network layers that receive the scene feature tensor 326 as input (e.g. a 256>1 mapping). In one case, the scene feature tensor may comprise a scene feature vector with a defined length (e.g., 256 or 512). As is described below, the scene feature tensor 326 may be used by other trained neural network components within the mapping system as an input feature for prediction of scene or environment-based properties, including, but not limited to, place identification, object identification and classification, and environment classification (e.g. favourable or hazardous, internal or external, navigable or unnavigable, as well as multi-class classifications). The scene feature tensor 326 may be seen as a lighting or view independent representation, or a joint latent representation of different lighting and view properties. This representation, for example, may embody information regarding structural features of the environment (such as macro positions of objects and boundaries).

In FIG. 3B, the colour mapping portion 328 of the fully-connected neural network 320 receives the view parameters 314 and the scene feature tensor 326 as input and is trained to map this input to the RGB value 334. As discussed above, the view parameters 314 may represent a direction of a ray that is viewing the point at sample location 312. The scene feature tensor 326 thus may be said to comprise information regarding the properties of the point that may be used to predict an appearance of the point when given a viewing direction. Hence, the scene feature tensor 326 may be said to be a high dimensional, neural representation of the environment, which implicitly includes appearance, context and semantic scene information that may be relatively simply mapped to explicit scene property values. The scene feature tensor 326 is thus highly informative for a mapping engine such as 110 or 210 and may be incorporated into functions evaluated by the mapping engine and/or neural predictions of properties used in mapping functions, such as simultaneous localisation and mapping.

In FIG. 3B, the colour mapping portion 328 may comprise a small number of fully-connected neural network layers (e.g. one or two with activation functions). In certain cases, the scene feature tensor 326 and the view parameters 314 may be concatenated to form an input for the colour mapping portion 328. In a test case, a 128-channel neural network layer is used followed by a final neural network layer with a sigmoid activation function that outputs a tristimulus value (i.e. three predicted parameter values) that may be used as an RGB value 334. The output RGB value 334 may comprise a normalised floating point RGB representation (e.g., with values from 0 to 1) that may be mapped to a quantised RGB value of a defined bit-depth if necessary (or retained as floating-point values for ease of further computations). The colour mapping portion 328 may be considered a shallow mapping that determines view or lighting dependent modifications. FIG. 3B shows how a relatively shallow mapping (e.g., 328) may be used to convert the high-dimensional and high-information scene feature tensors to concrete, useable outputs (in this case, colour values). In effect, the output property (e.g., colour in FIG. 3B) is distributed between view-invariant mapping parameters (e.g., parameters of 324) and view-variant mapping parameters (e.g., parameters of 328). A similar effect applies for other semantic properties, e.g. a shallow fully-connected neural network may classify objects in the environment based on the scene feature tensors 326 using the latent information within the tensors and the additional information embodied in the parameters of the shallow mapping.

FIGS. 3A and 3B are based on a neural radiance field architecture (e.g., similar to NeRF) but other neural network scene representations may be configured in a similar manner to generate a set of scene feature tensors 326 for use in mapping functions based on a supplied pose. The example process 300 of FIG. 3A may be used to predict image data as described with reference to other examples, e.g. to generate synthetic views of an environment.

Known or developed adaptations to neural radiance field architectures may be applied in the present case to adapt the schematic architectures and processes of FIGS. 3A and 3B. For example, the process 300 may be split into coarse and fine stages at different spatial and/or temporal resolutions, with an initial coarse prediction being made first and then passed as an input to a fine prediction that provides additional detail. In certain cases, one or more of the sample locations 312 and view parameters 314 may be pre-processed using a positional encoding to produce an intermediate tensor of length greater than the original input but less than the output of the fully-connected neural network 320. The positional encoding may operate similar to a positional encoding or embedding as applied in Transformer architectures to map continuous input coordinates into a higher dimensional space to enable the fully-connected neural network 320 to more easily approximate a higher frequency function. Also, RGB has been used as an example colour space but other colour spaces may be used based on the implementation (e.g., YUV or LAB).

Figure 4:
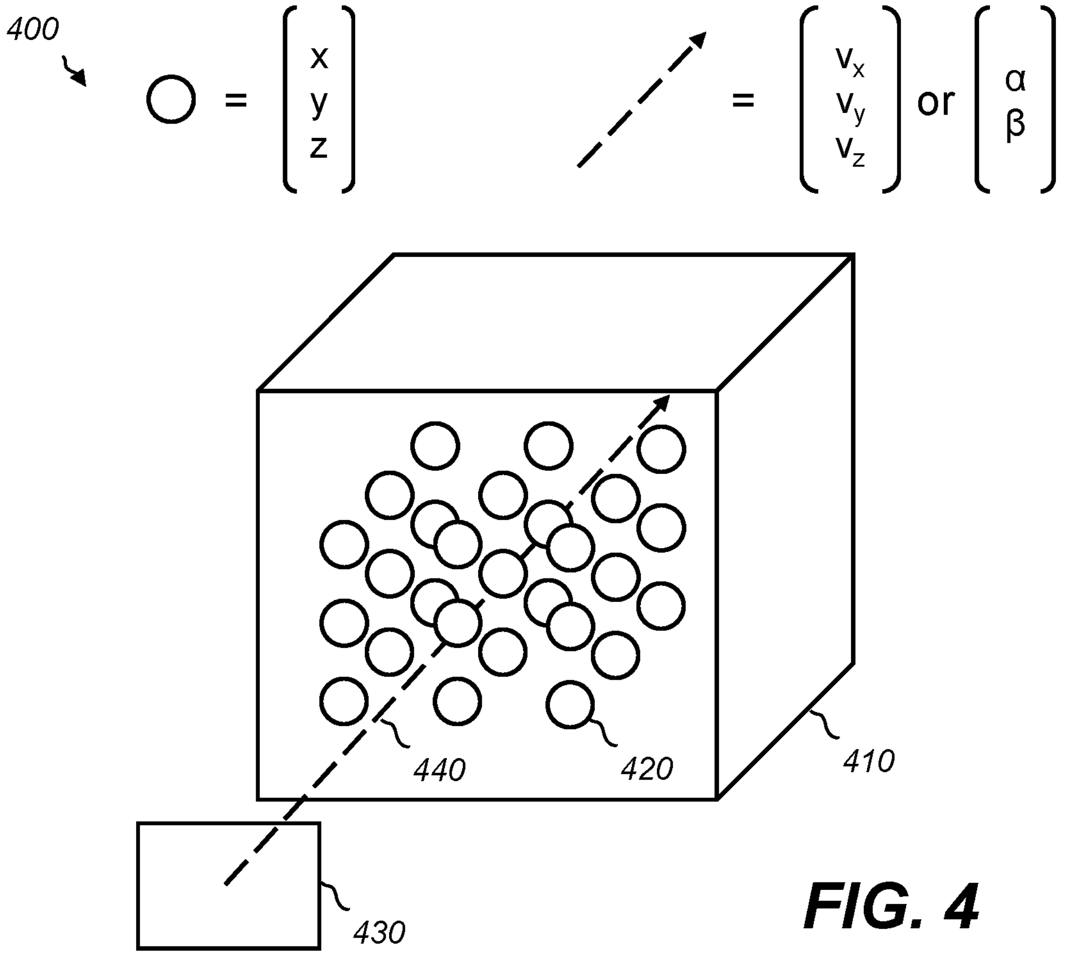
FIG. 4 is a schematic illustration showing an example view of a three-dimensional volume.

FIG. 4 shows a simplified visual example 400 to complement FIGS. 3A and 3B. FIG. 4 shows a volume 410 representing a frame of reference for an environment, such as a 3D coordinate system. Within the volume 410 are shown a number of sample locations 420. In this example, these may be represented by a 3D coordinate as shown, where the 3D coordinate may be used as the sample location 312 in FIGS. 3A and 3B. FIG. 4 shows an image plane 430 that is defined based on a supplied pose, such as pose 305 in FIG. 3A. For example, the pose 305 may represent the centre of a pin-hole camera that is observing the environment. FIG. 4 also shows one ray 440 that is traced for a given pixel of the image plane. As shown in FIG. 4 the ray direction may be defined by a vector or a set of angles. The vector or set of angles (or quaternion) may be used as the view parameters 314 of FIGS. 3A and 3B.

The neural network scene representation of FIGS. 3A, 3B and 4 differs from a point cloud representation in that properties are not defined in relation to set points in a frame of reference. Instead, locations within a frame of reference are sampled, and the properties are "stored" as predictions that are generated based on the sample location and/or view parameters. Hence, different points may be sampled and consistent properties retrieved—the output is a smooth manifold within the output space that is differentiable and may be interpolated. This is not possible with a point cloud as there is no continuous function that relates the properties of even neighbouring points. As well as providing a differentiable representation of a scene or environment, the neural network scene representation also provides at least an intermediate high dimensional representation (e.g., in the form of scene feature tensors 326) that is smooth, i.e. that avoids some of the issues with patchy or discontinuous point cloud representations as used by other SLAM methods. This provides an improvement for computations (e.g., avoids some of the problems encountered with the discontinuous estimates of point cloud properties) and navigation, as improved, more consistent control may be determined and applied. This is explained in further detail with respect to the additional embodiments set out below.

Figure 5:
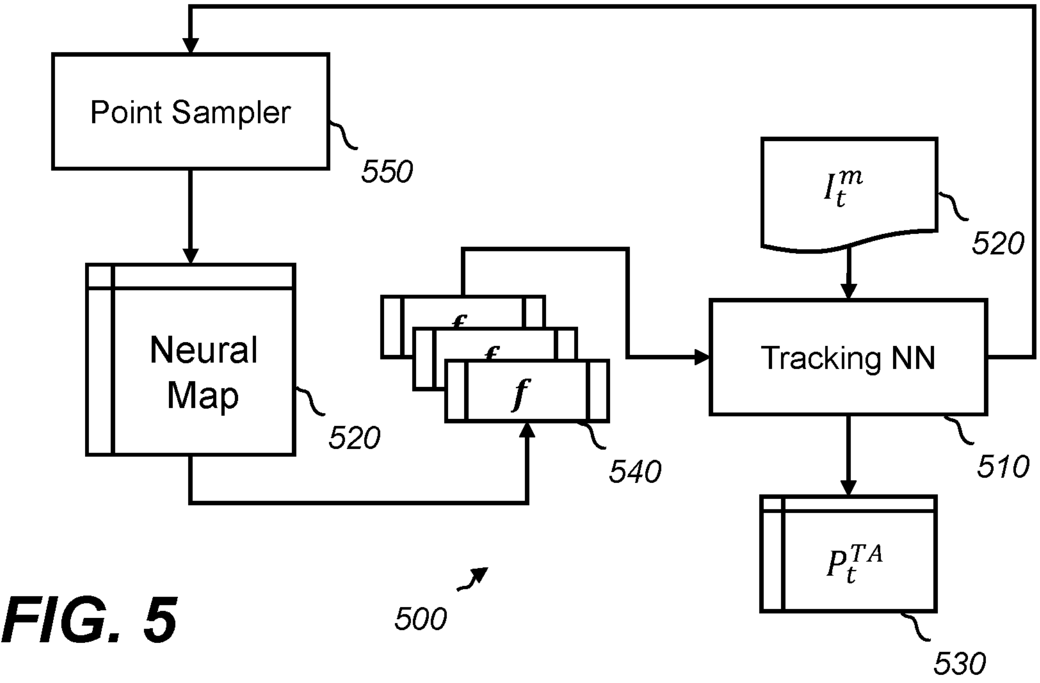
FIG. 5 is a schematic illustration showing an example mapping system according to a third embodiment.

Further Example Embodiments of Mapping Systems Using Neural Network Scene Representations FIG. 5 shows a third embodiment of the present invention. The third embodiment may be based on one or more of the first and second embodiments described above. FIG. 5 shows a mapping system 500 that comprises a tracking neural network architecture 510 and a neural map 520. The tracking neural network architecture 510 may comprise a SLAM system that comprises one or more neural networks. The tracking neural network architecture 510 is configured to receive measured image data 520 over time, denoted by $$I_t^m$$

in the FIG. 5, and to map this to a current pose of an object 530, denoted by $$P_t^{TA}.$$

The measured image data 520 may be provided as frames from a video camera and the tracking neural network architecture 510 may derive image data from one or more frames to generate an input for the one or more neural networks that map to the pose 530. As such, the tracking neural network architecture 510 may be based on comparative neural SLAM architectures. The neural map 520 may comprise an implementation of the neural network scene representation as described in any of the previous examples.

In FIG. 5, the tracking neural network architecture 510 differs from comparative neural SLAM architectures in that it obtains one or more scene feature tensors 540 from the neural map 520. These scene feature tensors 540 are used in tracking functions and mappings that are performed by the tracking neural network architecture 510. For example, they may be used in optimisation functions that are evaluated (e.g., in real-time) to determine the pose 530. It should be noted that in this example, even though a tracking neural network architecture 510 is described, other implementations may utilise a similar arrangement but without a neural network architecture 510 for the tracking, e.g. the tracking may use an alternative optimisation and/or dynamic programming approach.

In use, the tracking neural network architecture 510 makes queries the point sampler 550 in order to obtain an appropriate set of scene feature tensors 540. For example, the point sampler 550 may be based on the point sample selection process 310 described with respect to FIGS. 3A and 3B. As such, the scene feature tensors 540 may comprise at least the scene feature tensors 326 in FIG. 3B. In this case, the neural map 520 may comprise neural network layers similar to those used to implement the feature mapping portion 324 of the fully-connected neural network 320 described with respect to FIGS. 3A and 3B. In certain cases, the neural map 510 may not implement the additional mapping to an RGB value 334 or the volume rendering operation 340, such that the tracking neural network architecture 510 operates on the scene feature tensors 540 without using these to generate an image.

Many dense SLAM systems evaluate a photometric error as part of one or more optimisation functions to derive the pose 530. In certain cases, the tracking neural network architecture 510 may include functions similar to the colour mapping portion 328 and the volume rendering operation 340 to generate image data similar to 345 for comparison. However, in preferred cases, optimisation functions may directly evaluate the scene feature tensors 540, e.g. for different poses that are supplied to the point sampler 550, without needing to render a complete image.

In certain cases, the tracking neural network architecture 510 may utilise the scene feature tensors 540 for more than one function. For example, as they contain a representation of environment semantics and appearance, they may be used for localisation and/or environment classification. As the scene feature tensors 540 are informative as a high dimensionality representation of the scene, they may allow improved tracking performance by tracking neural network architecture 510, i.e. more accurate pose output 530.

Figure 6:
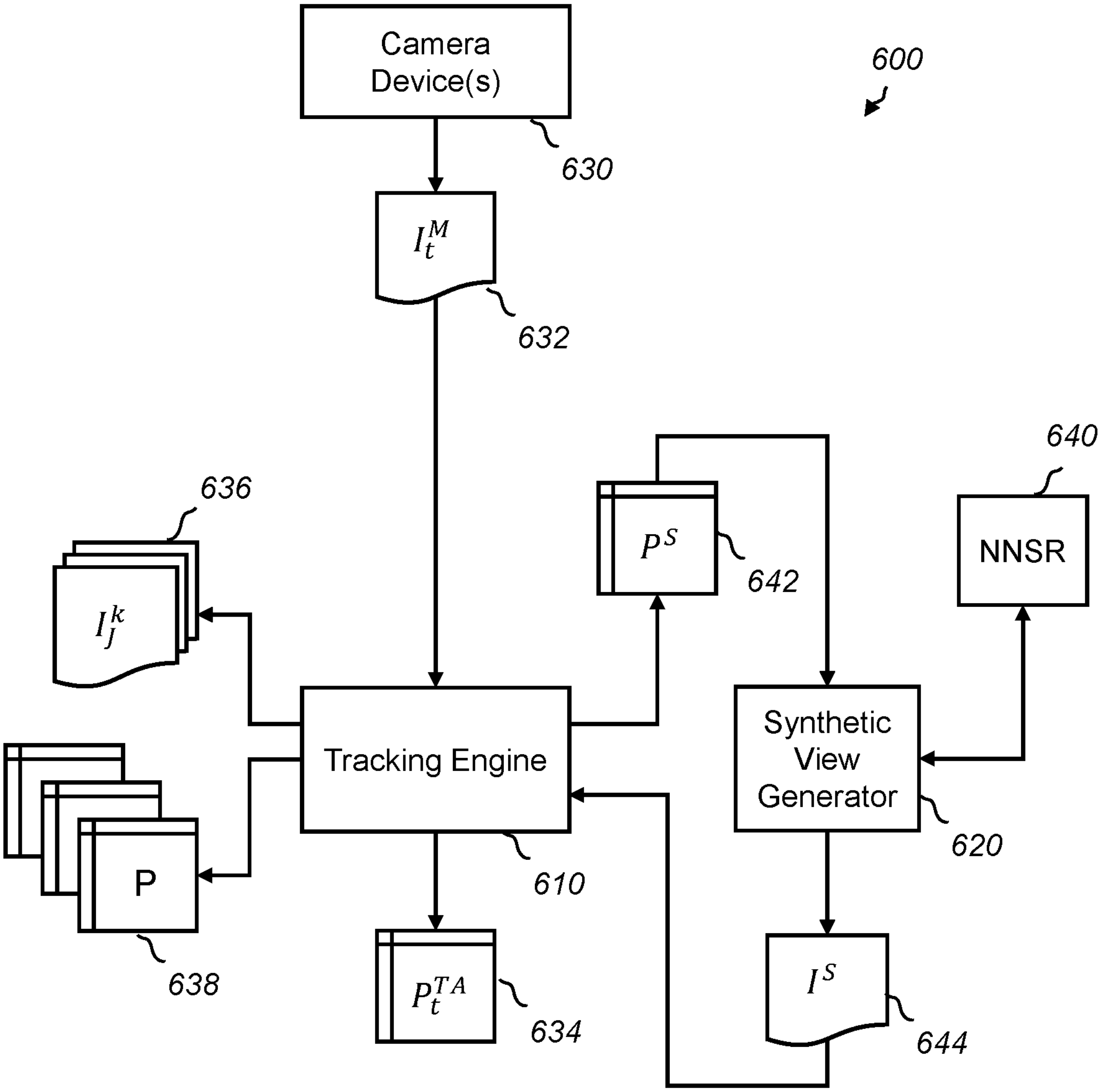
FIG. 6 is a schematic illustration showing an example mapping system according to a fourth embodiment.

FIG. 6 shows a fourth embodiment of the present invention that incorporates elements of the other examples described herein. For example, the embodiments of FIGS. 5 and 6 share several elements. FIG. 6 shows a tracking engine 610 and a synthetic view generator 620. The tracking engine 610 may comprise an implementation of a SLAM system in a similar manner to one or more of the mapping engine 110, SLAM engine 210, or tracking neural network architecture 510 of previous examples. The tracking engine 610 may form part of an autonomous and/or robotic device that is navigating an environment or may be implemented as part of a mobile computing device that a user is using to explore an environment. The tracking engine 610 is communicatively coupled to one or more camera devices 630. The camera devices 630 may, for example, comprise one or more cameras available on a smartphone, a navigation camera on a drone, or a dashboard camera on an autonomous vehicle. The camera devices 630 provide a stream of image data 632 to the tracking engine 610. This may be provided in a similar manner to the aforementioned other examples. The tracking engine 610 is then configured to compute a pose 634 for an object or device navigating a surrounding environment. For example, the pose 634 may be the pose for the aforementioned autonomous and/or robotic device or the pose of the aforementioned mobile computing device. The pose 634 may indicate the location and orientation of the object or device relative to a defined coordinate system and thus allow data defined with respect to the defined coordinate system, such as an information model, to be available to a user of the object or a device. For example, the pose 634 may be used to display an augmented or virtual reality image of the information model located and oriented correctly with regard to the pose 634.

In use, the tracking engine 610 receives the image data 632 as it is acquired and stores a collection of image data 636 for use in determining the pose 634. The pose 634 comprises a pose at a current time t. To determine the pose 634 the tracking engine 610 also stores a sequence of poses 638 (e.g., a trajectory) that represent movement of the device and object over time. In one case, the sequence of poses 638 may comprise a pose graph as known in the art.

In the fourth embodiment of FIG. 6, the tracking engine 610 is communicatively coupled to the synthetic view generator 620. In this embodiment, the synthetic view generator 620 operates in association with a neural network scene representation 640 to generate a synthetic view 644 based on a supplied synthetic pose 642. It should be noted that although reference is made to synthetic views and poses, the synthetic view generator 620 may also generate predicted images for known poses. The synthetic view 644 in this example comprises image data similar in form to the measured image data 632. The synthetic view generator 620 may use the neural network scene representation 640 in a similar manner to the inference mode of the example of FIG. 2C. In one case, a synthetic view 644 may be generated using a process similar to that shown in FIG. 3A. For example, the synthetic pose 642 may be processed in a similar manner to pose 305 in FIGS. 3A and 3B, and the synthetic view 644 may be rendered in a similar manner to image data 345. In other implementations, other image generation approaches may be used based on the neural network scene representations previously described.

In particular, the synthetic view generator 620 may be configured to generate one or more input feature tensors for the neural network scene representation 640 that are indicative of a synthetic pose 642. These one or more input feature tensors may be passed to the neural network scene representation 640, and a rendered view 644 may be generated from the synthetic pose 642 using the output scene feature tensors of the neural network scene representation 640. In one case, the neural network scene representation 640 comprises a first neural network architecture (similar to the feature mapping portion 324 in FIG. 3B) to map the input coordinate tensors (similar to 312) to the scene feature tensors (similar to 326), and a second neural network architecture (similar to the colour mapping portion 328) to map the scene feature tensors to a colour component value (similar to 334). In this case, the synthetic view generator 620 may be further configured to: model a set of rays from the synthetic pose that pass through the environment; determine a set of points and a viewing direction for each ray in the set of rays; determine a set of input coordinate tensors for the neural network scene representation based on the points and viewing directions for the set of rays; use the neural network scene representation to map the set of input coordinate tensors to a corresponding set of scene feature tensors and colour component values for the set of rays; and render the output of the neural network scene representation as a two-dimensional image.

In the fourth embodiment of FIG. 6, the tracking engine 610 may use the synthetic views 644 for a variety of functions. In one case, the pairs of synthetic poses 642 and synthetic views 644 may be used to respective augment the sequence of poses 638 and the corresponding collection of image data 636. For example, the tracking engine 610 may evaluate an objective function over the images 636 and poses 638. The objective function may be optimised to determine the current pose 634. For example, the current pose 634 may be a pose that minimises an error evaluated with respect to the images 636 and poses 638. Augmenting the images 636 and poses 638 with synthetic images 644 and poses 642 may improve the accuracy of the computed pose 634. For example, a collection of images 636 derived solely from image data 632 may be restricted to a particular set of views of an environment as determined by an object or device navigating the environment (e.g., the object or device may not have access to portion of the environment or be able to make large discontinuous changes in position). However, by using the neural network scene representation 640 to generate synthetic views 644, synthetic image data may be added to the collection of images 636 that allows smoother and more continuous optimisation and that is not restricted to many similar views of an environment. This is shown, for example, in FIG. 7.

Figure 7:
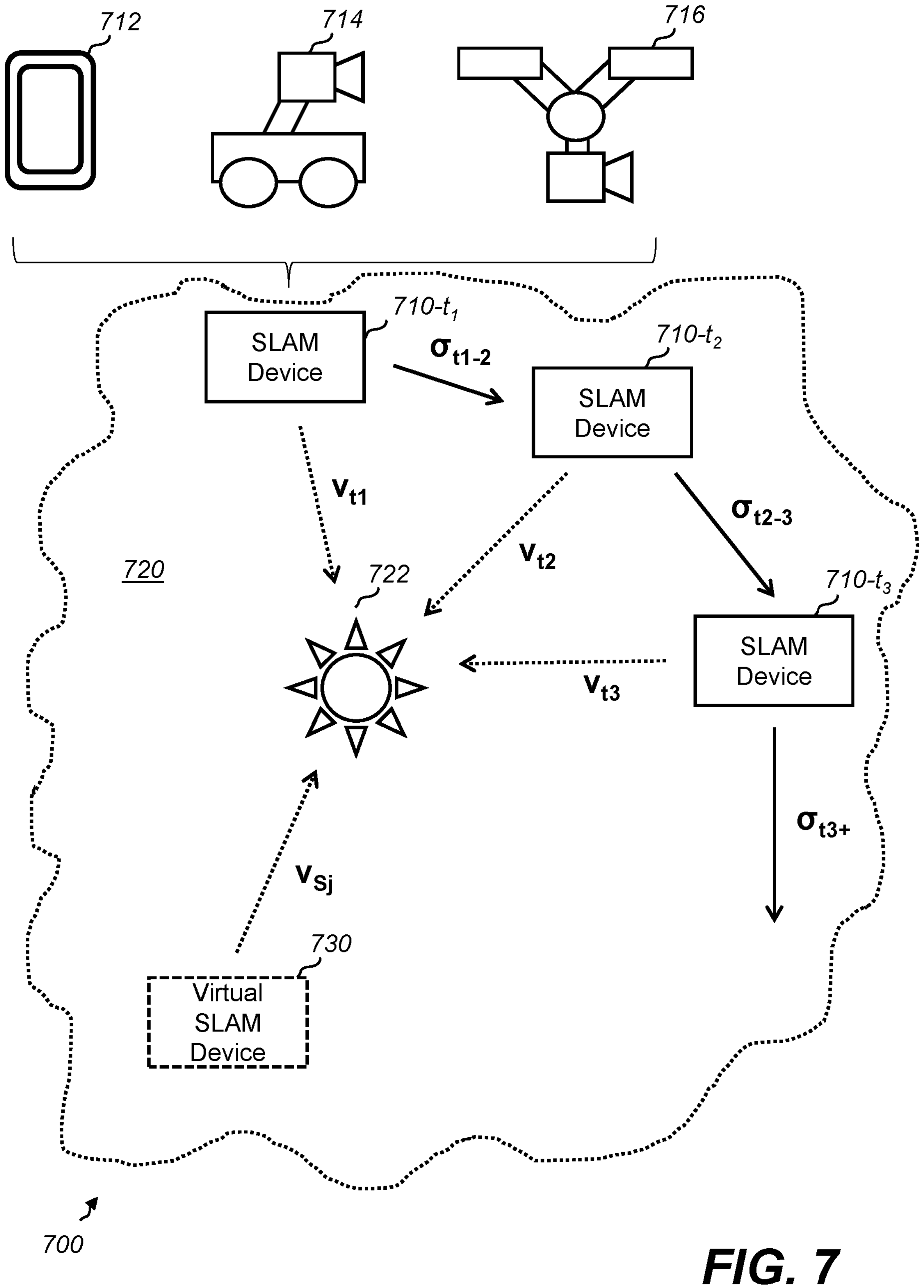
FIG. 7 is a schematic illustration showing how a mapping system may be used to generate virtual views of a scene.

FIG. 7 schematically shows an example 700 of a SLAM device 710 navigating an environment 720. The SLAM device 710 may comprise, for example, a mobile computing device 712 (e.g., a smartphone), a wheeled vehicle 714 or an aerial drone 716. The SLAM device 710 is equipped with a set of one or more cameras (e.g., in a similar manner to the embodiment of FIG. 6). FIG. 7 shows the SLAM device 710 moving within the environment 720 from time $t_1$ to time 13. The movement of the SLAM device 710 is parameterised via odometry vectors $\sigma_i$ and at each of the three illustrated locations a view of at least a portion of the environment, represented by 722, is acquired. View vectors $v_i$ illustrated a pose of at least one camera of the SLAM device 710.

In a comparative SLAM system, SLAM device 710 uses images of the environment that are acquired during movement to determine a pose of the SLAM device 710 as it navigates the space. However, as can be seen in FIG. 7, due to physical constraints this comparative SLAM system has a limited set of views, $v_1$, $v_2$ and $v_3$ for use in determining the pose (e.g., for use in determining the pose at time $t_3$). Using the fourth embodiment shown in FIG. 6, the SLAM device 710 in FIG. 7 is able generate one or more synthetic views vs to complement the measured views, $v_1$, $v_2$ and $v_3$. Effectively, the supply of a synthetic pose 642 represents a virtual SLAM device 730 located at another position with a different view of the portion of the environment 722. In FIG. 7 it may be seen that the synthetic views may allow views from behind objects and structures, which can provide additional information to allow a current pose to be determined.

It should be noted that the synthetic views described herein (such as 644) do not need to be entirely accurate or reflective of "good" human perceivable images to improve the tracking of a SLAM system. As many SLAM systems optimise over a collection of images and poses, the additional information of the synthetic views may still improve the optimisation even if they have errors. For example, the synthetic view generator 620 need not generate "perfect" views to improve the tracking engine 610 (although the better the fidelity of the synthetic views, the greater the improvements to tracking).

In certain cases, different parameters for the neural network scene representations described herein may be used for different viewed portions of an environment. For example, in FIG. 7, the portion 722 of the environment 720 may comprise a landmark (i.e., a distinctive location within the environment) and parameters for the neural network scene representation may be loaded for the landmark. As the SLAM device 710 navigates the environment 720 and arrives at different locations with different landmarks, corresponding parameters for the neural network scene representation may be loaded such that the neural network scene representation makes accurate predictions. For example, landmarks may be associated with particular rooms of a building or with particular exterior spaces.

In one case, the mapping systems described herein may further comprise a place recognition engine to determine if a current object location is a known object location based on data generated by one or more of the neural network scene representation and the mapping engine. For example, the place recognition engine may operate based on a current pose output by the mapping engine and/or based on scene feature tensors output by the neural network scene representation. In one case, parameters for the neural network architecture of the neural network scene representation are loaded for a determined known object location. In one case, a place recognition engine may comprise a neural network architecture that is trained on obtained image data to classify a current location as one of a set of predefined locations.

In certain cases, the tracking engine 610 of FIG. 6 may comprise one or more of a pose graph optimiser and a bundle adjustment engine. These may process one or more of the collection of image 636 and the sequence of poses 638, including additional synthetic data provided by way of the synthetic view generator 620. In one case, the pose graph optimiser and/or the bundle adjustment engine may be configured to optimise an initial sequence of poses for the object determined by the tracking engine, i.e. an initial set of values for the sequence of poses 638. The optimisation may be evaluated as a function of at least the collection of images 636, the initial sequence of poses, and the output of the neural network scene representation 640 (e.g., via the synthetic view generator 620).

Figure 8:
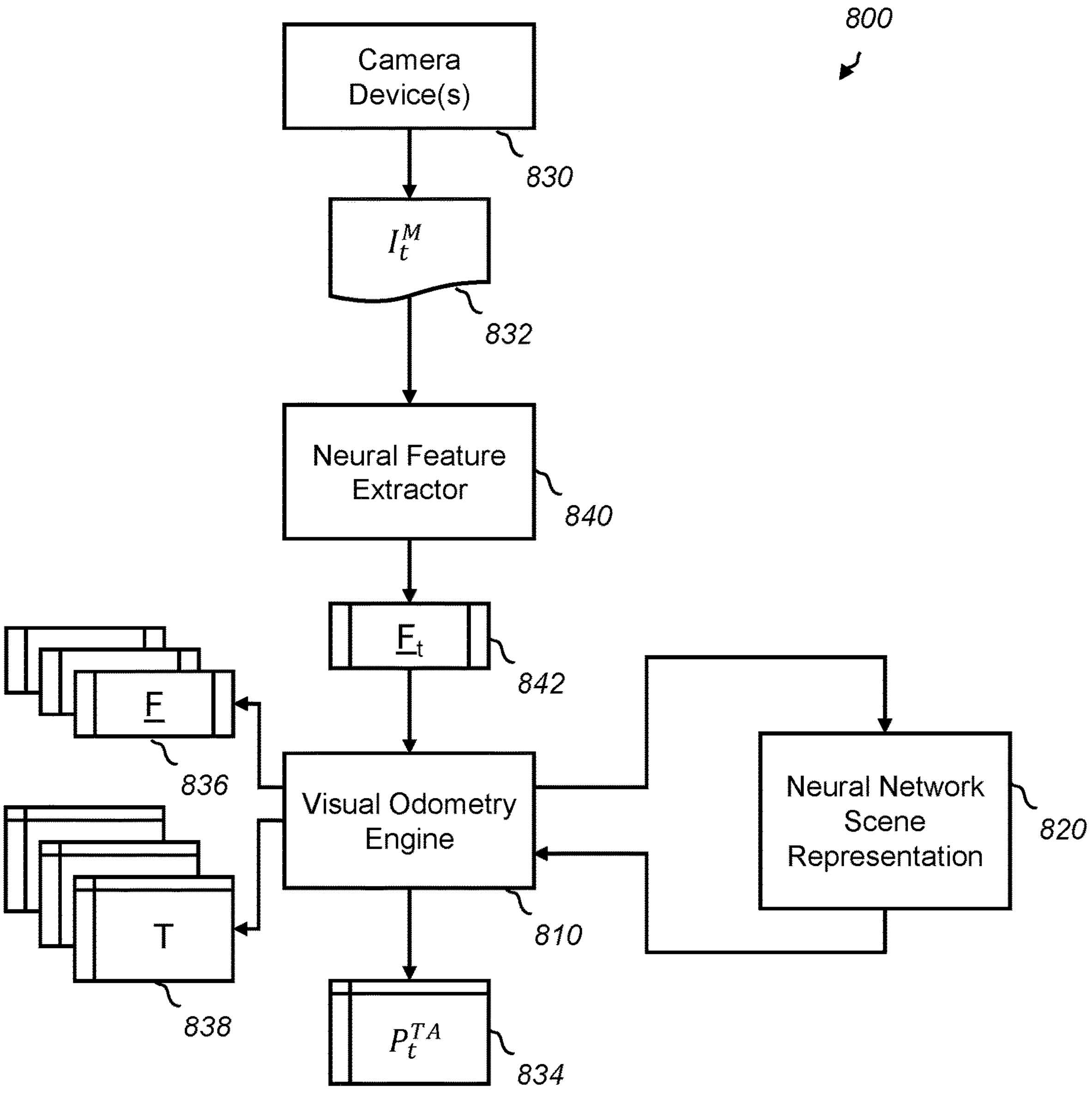
FIG. 8 is a schematic illustration showing an example mapping system according to a fifth embodiment.

FIG. 8 shows a fifth embodiment of the present invention that may be seen as a variation of the fourth embodiment of FIG. 6 and/or the first or second embodiments of FIGS. 1 and 2. FIG. 8 shows a mapping system 800 that comprises a visual odometry engine 810, a neural network scene representation 820, a set of camera devices 830 and a neural feature extractor 840. The visual odometry engine 810 may form part of a sparse SLAM system. In use, the set of camera devices obtain image data 832 in a similar manner to the previous examples. The image data 832 is provided to the neural feature extractor 840. The neural feature extractor 840 is image feature extractor that comprises one or more neural networks to map an input image to an image feature tensor. For example, the neural feature extractor 840 may comprise a neural network architecture with one or more CNN layers such as ResNet or UNet. The neural feature extractor 840 thus receives image data 832, which may, for example, comprise frames of a video stream, and in an inference mode maps these frames to respective image feature tensors 842. In one case, an image feature tensor 842 may be estimated using the neural feature extractor 840 for every input frame from a video stream or for a set of key frames for a video stream. The image feature tensors 842 are thus generated over time and may be stored by the visual odometry engine 810 as a collection of image feature tensors 836.

In use, the collection of image feature tensors 836 are processed by the visual odometry engine 810 to determine a current output pose 834 (e.g., with respect to a define frame of reference). The visual odometry engine 810 may determine the current output pose 834 by determining a set of transformations 838 that between the image feature vectors 836 over time. For example, a transformation for time (1-2 may map from an obtained image feature tensor at time $t_1$ to an obtained image feature tensor at time $t_2$. The visual odometry engine 810 may use the neural network scene representation 820 to determine the set of transformations 838, and the set of transformations 838 may be optimised to determine the current pose 834. The set of transformations 838 may be seen as a set of correspondences between the image feature tensors 836 over time. The "sparse" fifth embodiment of FIG. 8 may be faster for real-time operation than the "dense" fourth embodiment of FIG. 6, but with the possible trade-off of reduced accuracy.

Now in the example of FIG. 8, at least the neural feature extractor 840 may be trained in a manner similar to that shown in FIGS. 1B and 2B. For example, parameter values for the neural feature extractor 840 may be determined by training the complete mapping system 800 in an end-to-end manner using a training set that comprises image data and ground-truth poses (e.g., the former being using as input image data 832 and the ground-truth poses being compared with predicted pose 834) or just a set of image data. In this case, the whole mapping system 800 may be trained if the visual odeometry engine 810 is differentiable, as both the neural feature extractor 840 and the neural network scene representation 820 are differentiable. In one case, the visual odeometry engine 810 may comprise one or more neural networks that are differentiable; in other cases, the visual odeometry engine 810 may implement one or more differentiable functions. For example, differentiable visual odometry approaches are described in the earlier mentioned GradSLAM paper. In general, any of the mapping or SLAM engines described herein may be configured as a differentiable architecture as described in this paper, and so benefit from training with a further differentiable mapping module in the form of the neural network scene representation as described herein.

In certain cases, all of the neural feature extractor 840, the visual odometry engine 810 and the neural network scene representation 820 may comprise coupled neural network architectures (e.g., that collective form a single compute graph for training). As such they may be trained together with parameters selectively set as fixed or trainable as described with reference to FIGS. 2B and 2C. For example, in the case that the visual odometry engine 810 queries the neural network scene representation 820 (e.g., with a pose such as 305 in FIG. 3A or individual sample locations such as 312 in FIG. 3B), the neural network scene representation 820 may return scene feature tensors such as 326 in FIG. 3B or 540 in FIG. 5. These may be used, together with the image feature tensors 836, to predict one or more of the current pose 834 and transformations in the set of transformations 838. Having a trainable neural feature extractor 840 that is trained using information from a map of the environment may improve accuracy for real-time navigation or AR/VR on computing devices with limited resources.

Model Conversions

Figure 9A:
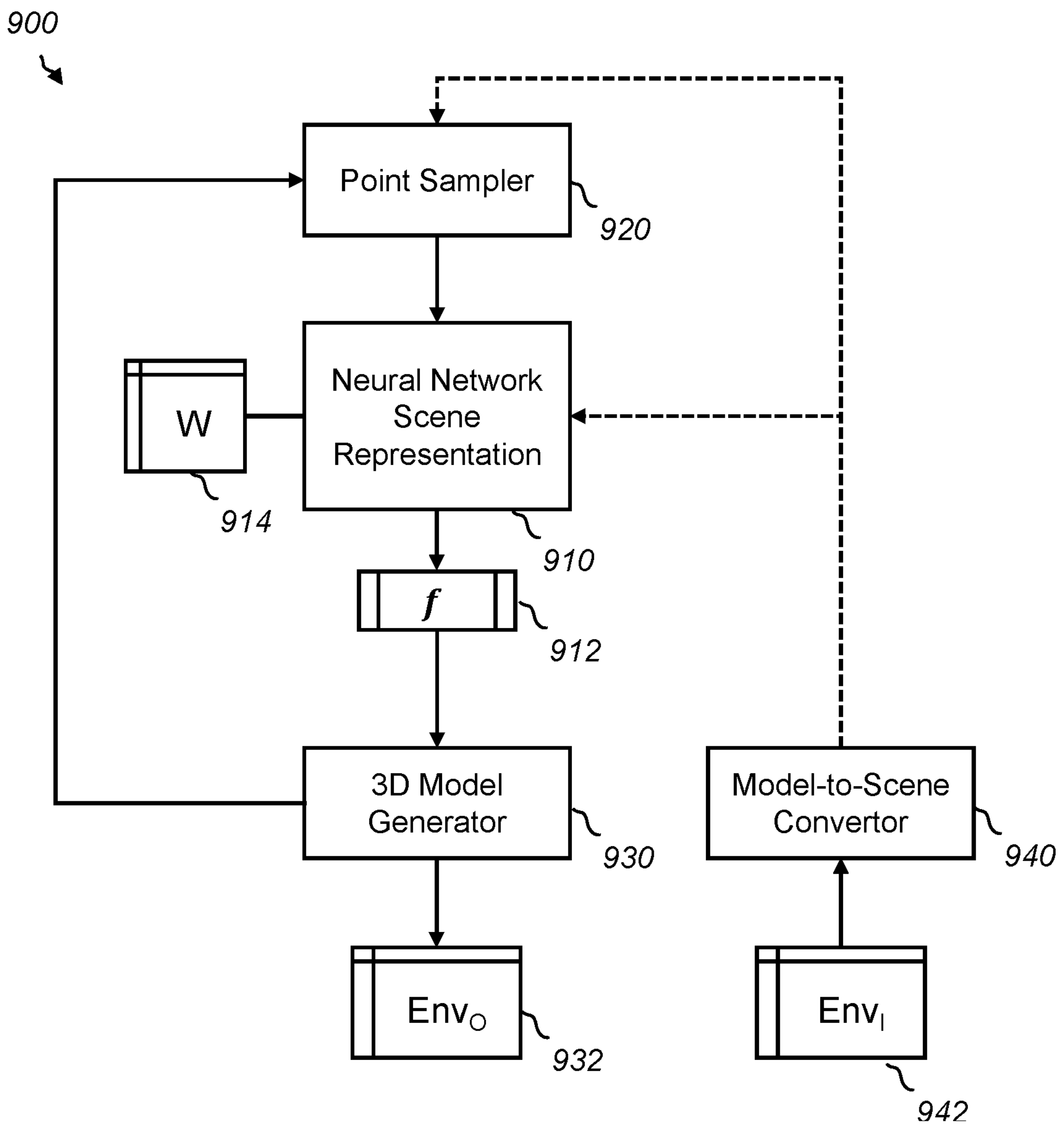
FIG. 9A is a schematic illustration showing how an output of a neural network scene representation may be mapped to and/or from a three-dimensional model of a scene.
Figure 9B:
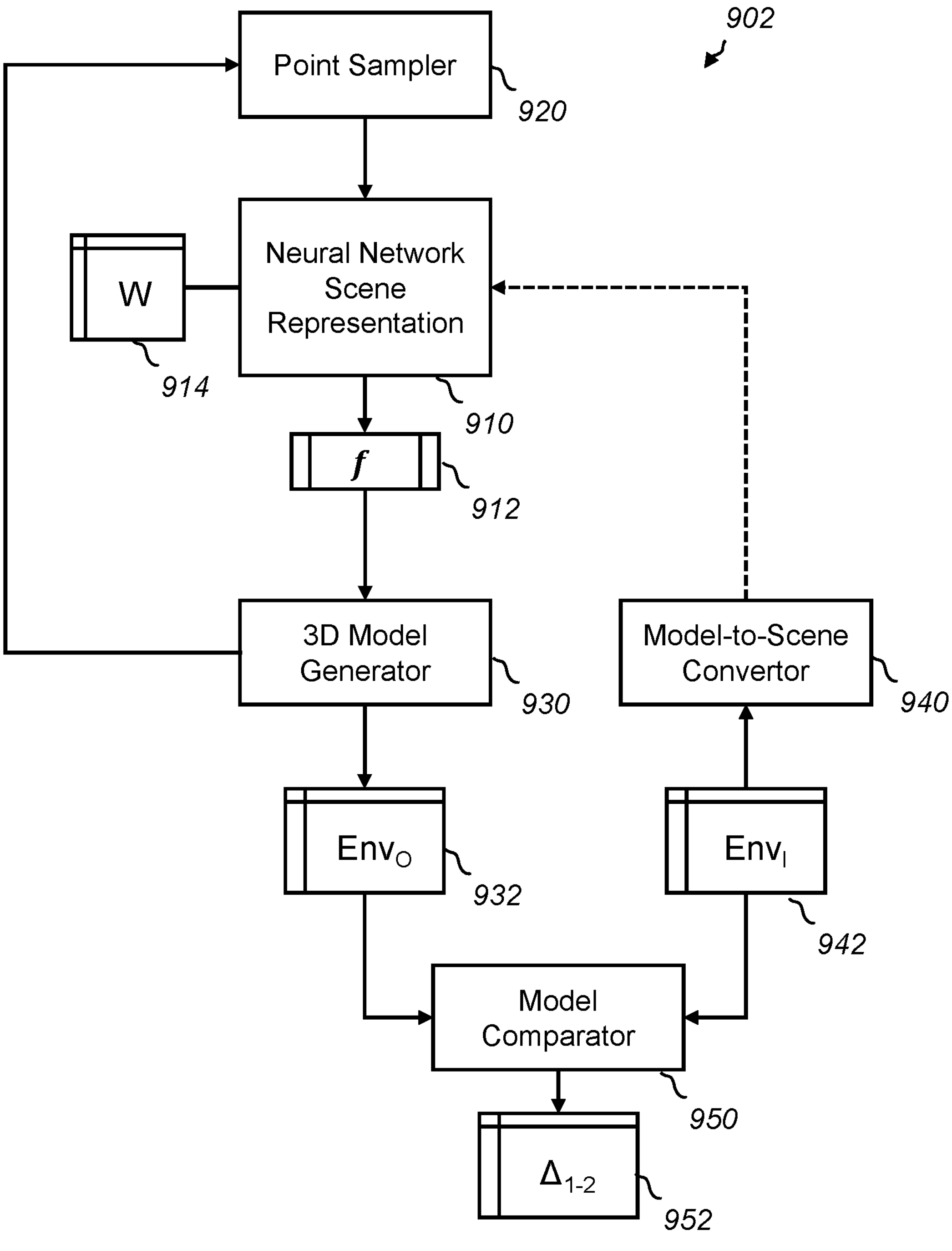
FIG. 9B is a schematic illustration showing a variation of the example of FIG. 8A to allow comparisons of three-dimensional models.
Figure 9C:
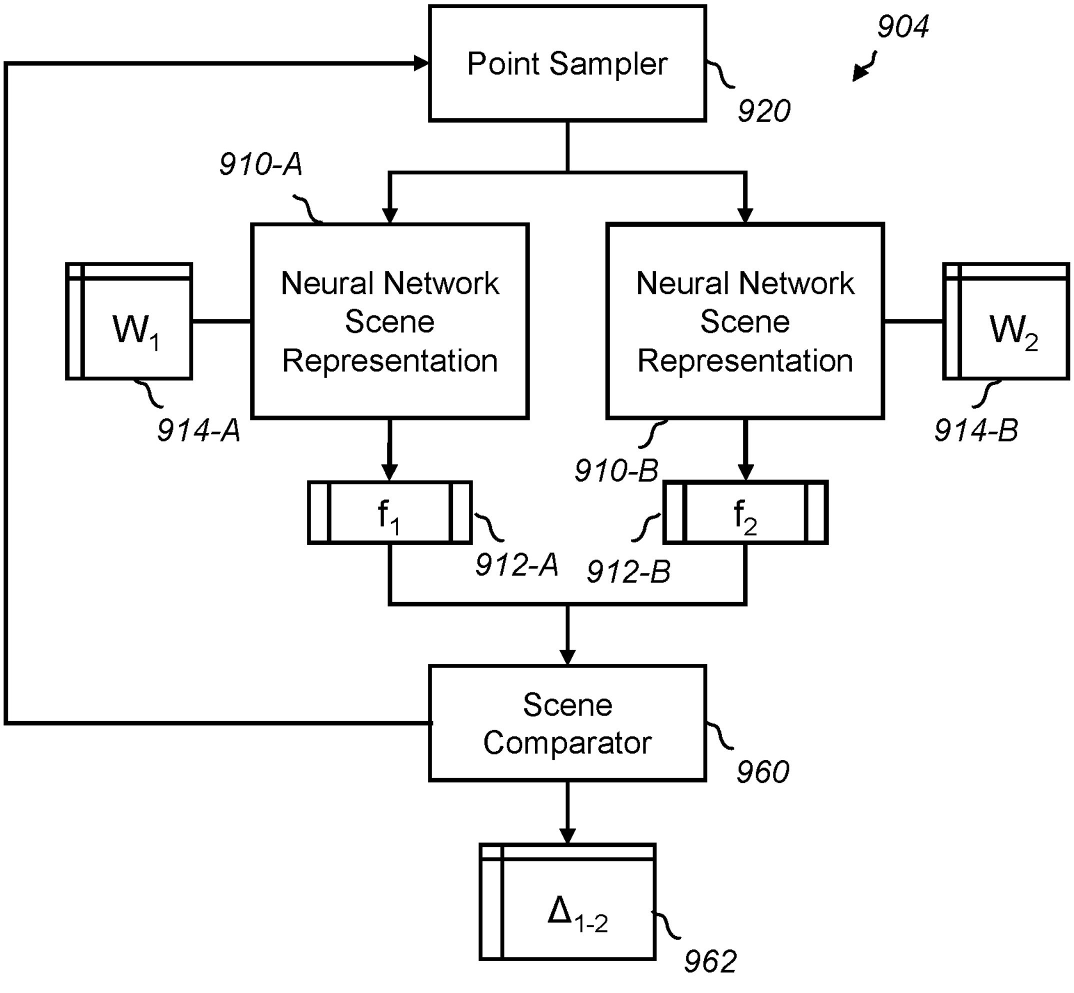
FIG. 9C is a schematic illustration showing an alternative example to compare the output of a neural network scene representation.

Examples of the use of neural network scene representations have been presented above. In certain cases, it may be desired to convert between neural network scene representations and more conventional point cloud representations, e.g. 3D maps and models as used in known modelling systems, such as known Computer Aided Graphics (CAD) systems. FIGS. 9A to 9C show additional components that may be used with any of the described embodiments to perform this conversion. FIG. 9A shows a first example 900, FIG. 9B shows a second example 902, and FIG. 9C shows a third example 904. In certain cases, these examples may also be implemented independently of the previously described embodiments, e.g. may be implemented as further embodiments of the present invention.

FIGS. 9A and 9B show a neural network scene representation 910. The neural network scene representation 910 is configured to output one or more scene feature tensors 912 and is parameterised by a set of parameters 914 (shown as weights W to avoid confusion with the pose P of other examples). For example, the neural network scene representation 910 may comprise at least the feature mapping portion 324 of FIG. 3B or the fully-connected neural network 320 of FIG. 3A or any of the previously described neural network scene representations. In FIGS. 9A and 9B, the neural network scene representation 910 receives input tensors from the point sampler 920, which may operate in a similar manner to the point sampler 550 of FIG. 5 or the point sample selection process 310 of FIG. 3A.

In the examples 900, 902 or FIGS. 9A and 9B, a 3D model generator 930 is provided that is communicatively coupled to the neural network scene representation 910. The 3D model generator 930 receives an output of the neural network scene representation 910 and uses this to generate an output 3D model of the environment 932. In FIG. 9A, the 3D model generator 930 is shown being communicatively coupled to the point sampler 920. In use, the 3D model generator 930 makes requests to the point sampler 920 to obtain scene feature tensors 912 associated with desired points in the output 3D model 932. The 3D model generator 930 then maps the scene feature tensors 912 to point properties that may be stored alongside the desired points. For example, the 3D model generator 930 may iteratively select point locations within a frame of reference, obtain scene feature tensors 912 associated with the point locations, map those scene feature tensors 912 to property values and then store the property values in a look-up store that is indexed by point locations. In a simple case, the 3D model generator 930 may map the scene feature tensor 912 onto an occupancy value for a requested point or select an element within the scene feature tensor 912 that represents a volume density and quantise this to generate an occupancy value. In this case, the 3D model generator 930 may generate a set of binary occupancy values that may represent traditional "points" in a point cloud (i.e., detected object locations).

In one case, the output 3D model 932 comprises a point cloud model with geometric structures represented using coordinates within a three-dimensional frame of reference. For example, a wall may be represented by points in the frame of reference that form part of the wall, which may be determined by the 3D model generator 930 based on sampled points with a mapped occupancy above a threshold. In one case, the output 3D model 932 represents geometric structures using point coordinates within a 3D frame of reference and metadata associated with the point coordinates. In this case, the 3D model generator 930 is configured to map scene feature tensors 912 output by the neural network scene representation 910 for determined point coordinates to said metadata. Mapping to point properties or metadata may be performed in a similar manner to the colour mapping described with respect to FIG. 3B. For example, the 3D model generator 930 may comprise one or more neural network layers configured to map the scene feature tensors 912 to a point property or metadata probability or class vector. The one or more neural network layers may form part of a relatively shallow fully-connected neural network architecture (e.g. with 1 to 5 layers). For example, if a point in the output 3D model 932 is classified as one of a set of objects (such as types of furniture or types of materials) then the one or more neural network layers may output a probability vector for the set of objects (e.g., using a softmax layer as known in the art). Different shallow fully-connected neural network architectures may be provided for different properties. The neural network layers of the 3D model generator 930 may be trained based on pairs of known parameters 914 for the neural network scene representation 910 and output 3D models 932, e.g. for explored rooms or areas that are also modelled in a CAD application. The parameters 914 of the neural network scene representation 910 may also be determined from a supplied 3D model. This may allow a so-called un- or semi-supervised training of the neural network scene representation (the terms are used variably in the art). This is described in more detail below.

In FIGS. 9A and 9B, a model-to-scene converter 940 is also provided. The model-to-scene converter 940 receives an input 3D model of the environment 942 and uses this to train the parameters 914 of neural network scene representation 910. If the output 3D model 932 and the input 3D model 934 are the same model, then the neural network scene representation 910 may be trained by comparing the input and output as shown in FIG. 9B.

The model-to-scene converter 940 may operate by rendering a plurality of views of the input 3D model 942, e.g. using conventional CAD rendering approaches. Each view of the input 3D model 942 has an associated pose. For example, a random sample of poses within the input 3D model 942 may be generated and used to generate a training set of poses and corresponding rendered images. This training set may then be used to train the neural network scene representation 910 (i.e., determine the parameters 914) as described with reference to FIG. 2C. Hence, the poses for rendered virtual camera views within the input 3D model 942 may be passed to the point sampler 920 and, as described with reference to FIGS. 3A and 5, used to determine sample locations for mapping to scene feature tensors 912. The scene feature tensors 912 may then be rendered into images as described with reference to FIG. 3A and the resulting images compared with the rendered virtual camera views. Alternatively, the scene feature tensors 912 may be converted into labelled properties in the output 3D model 932 by the 3D model generator 930 and the input and output property values may be compared within an optimisation function that drives the training of the neural network scene representation 910. In one case, a combination of these training methods may be used, e.g. where the optimisation function is a function of a photometric error between rendered views from the neural network scene representation 910 and the input 3D model 942 and/or compared point property values between the input and output 3D models 932, 942.

FIG. 9B shows an additional model comparator 950 that is configured to receive two 3D models and compare point properties within the models. For example, the additional model comparator 950 may compare point locations (e.g., comparing occupancy as indicated by the presence of defined points) and/or point properties at corresponding point locations (e.g., occupancy, colour, object class etc.). The model comparator 950 is configured to output a set of differences 952 between the two models.

In the example 902 of FIG. 9B, the input and output 3D models 942 and 932 are compared. For example, the input 3D model 942 may comprise an information model that represents a space that is being explored (such as a Building Information Model—BIM—that is generated based on a survey and/or offline CAD modelling). The input 3D model 942 may thus be an initial model of the environment. This model may be converted into parameters 914 for the neural network scene representation 910 by the model-to-scene convertor 940. In use, a device may explore the modelled environment using the neural network scene representation 910, e.g. as described with reference to other examples described herein. If a neural network scene representation 910 is configured as updatable during the exploration (e.g., as set using predefined user configuration data), then the parameters 914 may be updated using data obtained during the exploration. For example, in one or more of an online (i.e., during exploration) and offline (i.e., after exploration) update mode, image and pose data obtained during exploration may be used to update the parameters 914 as shown in one of FIGS. 2B and 2C. As described above, in one case, a learning rate may be set to control the updates to the parameters 914 (e.g., to prevent the parameters diverging from original extrema based on noise). For example, a small learning rate may prevent large scale changes to the parameters 914 based on statistical noise. The learning rate may be configured by a user based on their knowledge of the environment (e.g., if the environment has been known to change or there is a long time period between construction of the model and exploration, then a higher learning rate may be selected). In any case, in a mode where the parameters 914 are updated, the 3D model generator 930 may be used to generate an output 3D model 932 based on the updated values for the parameters 914. Following this, the model comparator 950 may be applied to compare the two 3D models 932 and 934 to determine a set of differences 952. As set out above, the set of differences 952 may comprise indicated differences in point locations and/or properties within a point cloud or other 3D geometric model. The set of differences 952 may thus be used to indicate how the environment has changed. For example, the set of differences 952 may indicate natural change over time, human modifications over time, change based on construction within the environment and/or a mismatch or "clash" between the input 3D model 932 and the actual environment.

In certain cases, the set of differences 952 may be reviewed by an operator to confirm updates to be made to the input 3D model 942. For example, individual differences in the set of differences 952 may be reviewed and accepted or refused, similar to a "track changes" feature within a word processing application. The differences that are accepted may be applied to the input 3D model 942 to generate an updated 3D model. This updated 3D model may then be input into the model-to-scene convertor 940 in place of the input 3D model 942. As such, this process may be applied repeatedly and iteratively over time to update 3D models.

FIG. 9C shows an alternative method for comparing representations of environments. In the examples of FIGS. 9A and 9B, the parameters 914 of the neural network scene representation 910 were converted from and to 3D model representations. The 3D model representations were then compared to determine changes in the environment. FIG. 9C presents an alternative approach whereby different instantiations of a neural network scene representation 910-A, 910-B may be directly compared without converting to an external 3D model.

In FIG. 9C, two instantiations of a neural network scene representation 910-A, 910-B are shown. Although these are shown side-by-side for ease of explanation, they may represent different versions of a common neural network scene representation 910 (e.g., different versions at different times). They may also represent, say, different instantiations based on two different devices that are exploring a common environment. Each instantiation shown in FIG. 9C has a set of corresponding parameters 914-A, 914-B. Differences in the parameters 914-A, 914-B results in differences in instantiation. Preferably, the neural network scene representations 910-A, 910-B both comprise a common or shared neural network architecture that only differs in the values of the parameters 914-A, 914-B (e.g., a common network model class). In one case, the first set of parameters 914-A may represent parameters at a first time $t_1$ and the second set of parameters 914-A may represent parameters at a second time $t_2$. These may represent an earlier and later time, e.g. before and after exploration of an environment.

In the example of FIG. 9C, each neural network scene representation 910-A, 910-B receives common (e.g., identical) input coordinate data from the point sampler 920, which may have a function similar to that described for the examples of FIGS. 9A and 9B. In FIG. 9C, the scene features tensors 912-A, 912-B that are respectively output by each neural network scene representation 910-A, 910-B for a given set of input coordinate data are received by a scene comparator 960. The scene comparator 960 then compares the scene feature tensor values to output a set of differences 962. The set of differences 962 may comprise a raw difference based on the subtraction of one of the scene feature tensors from the other of the scene feature tensors and/or a difference following a further neural network mapping, such as to RGB values and/or Boolean occupancy. In this case, the scene feature tensors 912-A, 912-B do not need to be converted into 3D model points to be compared.

In one case, the model-to-scene convertor 940 may be used to visualise a 3D model such as input 3D model 942. For example, once model-to-scene convertor 940 generates a set of trained parameters 914 for the neural network scene representation 910, the neural network scene representation 910 may be used as per the examples of FIG. 2C or 6 to generate synthetic views of the 3D model.

Evolving and Georeferenced Maps

In certain examples, neural network scene representations that are used as maps may be trained to use georeferenced points. Georeferenced points are point locations that have a known coordinate in a geographic coordinate system, e.g. that relate to a fixed point on the Earth's surface that is defined in a coordinate system for positions on Earth. For example, a geographic coordinate system may comprise a 2D location on a spherical plane plus an elevation to provide a 3D coordinate. Geographic coordinates may be defined in one or more of a spherical coordinate system (e.g., using geocentric latitude, longitude and elevation), ellipsoidal coordinates (e.g., using geodetic latitude, longitude and elevation), or Earth-Centred, Earth-Fixed (ECEF) Cartesian coordinates in three-dimensional space. Neural network scene representation may comprise neural network architectures trained to map input coordinate tensors derived from a georeferenced list of at least three-dimensional points to scene feature tensors of higher dimensionality. The trained neural network architecture may then be used to align a coordinate system of an environment, such as a construction site to a mapping coordinate system, such as that generated as an environment is explored. The list of three-dimensional points may be derived from a two-dimensional marker such as a QR code, e.g. that is accurately position within an environment, or at least three individual three-dimensional points that have been already georeferenced, e.g. surveyed points that have also been located within the mapping system.

In this manner, the neural network scene representation may learn a transformation that maps points within a positioning system (e.g., a SLAM location or pose) to an extrinsic (e.g., geographic) coordinate system such that measurements made using a SLAM device may be compared to a model defined in the extrinsic coordinate system, such as a building information model. In this manner, the neural network scene representation may be trained to geolocate a constructed map representation to an external environment such as a construction site, as a device navigates the external environment. The geolocated points act as a form of ground truth for the map. Hence, the neural network scene representation, when suitably trained, may be used to align a positioning or tracking coordinate system with an environment or model coordinate system. This process may be iterative such that maps are generated and "evolve" over time. For example, the processes shown in any one of FIGS. 9A to 9C may be iteratively performed as an environment is explored to build a map. In certain cases, updates to a map may be confirmed by a user and these may be fixed in the map.

Methods of Mapping and Navigation Using Neural Network Scene Representations

Figure 10A:
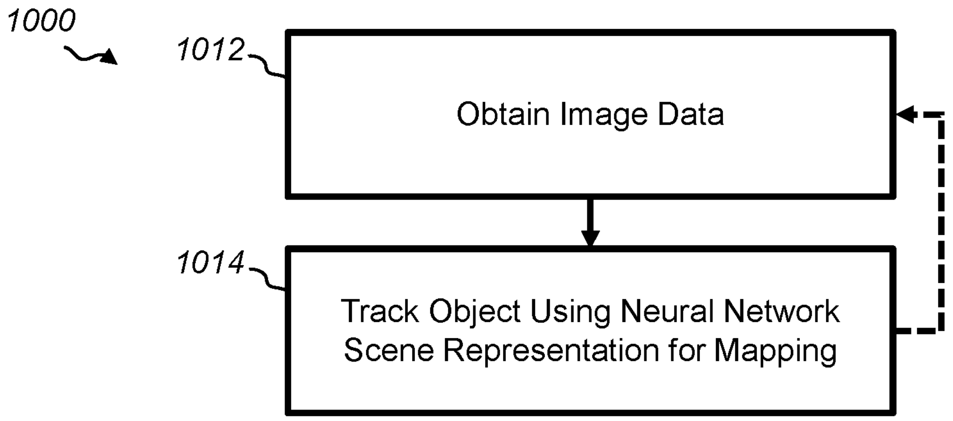
FIGS. 10A and 10B are flow charts showing method of mapping and navigation within an environment according to a sixth embodiment.

FIG. 10A shows an example method 1000 for mapping an environment according to a sixth embodiment. The method 1000 comprises a first operation 1012 of obtaining image data from one or more camera devices of an object as it navigates an environment. The object may comprise a mobile or embedded computing device and the method 1000 may be performed by at least one processor of this device (e.g., the device may comprise a device such as 712, 714 and 716 as shown in FIG. 7). In certain cases, the one or more camera devices may be mounted upon the object, e.g. statically or moveably. In one case, the object may comprise a portable camera that is communicatively coupled (e.g., via a wired or wireless communications channel) to a computing device that performs the method 1000 (e.g., a distributed computing configuration). Via a second operation 1014, the object is tracked within the environment using a differentiable mapping engine. The differentiable mapping engine may comprise any one of mapping engine 110, SLAM engine 210, tracking neural network architecture 510, tracking engine 610, and visual odometry engine 810. The mapping engine may be differentiable in that it may comprise one or more functions defined in computer program code that may be differentiated via auto differentiation computing libraries and/or have a defined differential that may be evaluated within electronic hardware. Tracking may comprise determining a pose of the object and/or camera device within time.

In method 1000, the differentiable mapping engine is configured using a neural network scene representation. For example, the differentiable mapping engine operates upon data output by the neural network scene representation to track the object within the environment. The neural network scene representation may comprise any of the previously described neural network scene representations. For example, the neural network scene representation may comprise a neural network architecture trained to map input coordinate tensors indicating at least a point location in three-dimensional space to scene feature tensors having a dimensionality greater than the input tensors. The neural network scene representation is communicatively coupled to the differentiable mapping engine, e.g. as shown in the embodiments described above. The differentiable mapping engine is configured to use the neural network scene representation as a mapping of the environment during operation of the differentiable mapping engine. For example, the neural network scene representation may be used in place of a point cloud or surfel representation. The neural network scene representation represents the environment as a learnt function of coordinate data, where properties of the environment are represented as scene feature tensors, i.e. learnt array representations of a high dimensionality that are highly informative may be easily mapped back to specific properties using shallow fully-connected neural network architectures. In one case, the differentiable mapping engine may use the scene feature tensors within dynamic programming functions that optimise one or more poses with respect to a collection of images so as to determine a current pose (e.g., which may be optimal with respect to the optimisation framework). In general, the differentiable mapping engine may be configured to use the neural network scene representation in any of the ways described herein.

In one case, the method further comprises using the image data obtained at operation 1012 to update the parameters of the neural network scene representation during movement of the object within the environment. In this manner, the neural network scene representation may also learn the environment, e.g. as described with reference to FIG. 2C. In certain cases, tracking the object within the environment using the differentiable mapping engine comprises determining a sequence of transformations from successive sets of image data obtained over time from the one or more camera devices, the sequence of transformations defining a set of poses of the object over time, and optimising the sequence of poses. For example, the differentiable mapping engine may perform operations similar to those described with respect to one or more of tracking engine 610 and visual odometry engine 810 in FIGS. 6 and 8. In this case, the neural network scene representation may be used to determine image data observable from a supplied pose for one or more of the determining and the optimising. For example, the neural network scene representation may be used by a synthetic view generator as described with reference to FIG. 6. In certain case, the image data may represent a projection of the mapping of the environment onto an image plane of the pose, e.g. be used in place of comparative projections as determined in comparative point cloud SLAM systems.

In one case, the differentiable mapping engine is configured based on an optimisation function using gradient descent. The optimisation function may comprise a difference between image data obtained using a known pose and image data predicted using a pose determined by the differentiable mapping engine, e.g. comprise the evaluation of a photometric error, but in this case at least a portion of the image data is predicted using the neural network scene representation.

In one case, the method 1000 may be applied in a mapping system similar to that shown in FIG. 8. In this case, the method 1000 may further comprise: extracting features from an input frame of image data obtained from the one or more camera devices using an image feature extractor; and determining the sequence of transformations based on correspondences between the extracted features. In this case, the image feature extractor may comprise a neural network architecture that is trained based on training data comprising samples of image data and object poses.

Figure 10B:
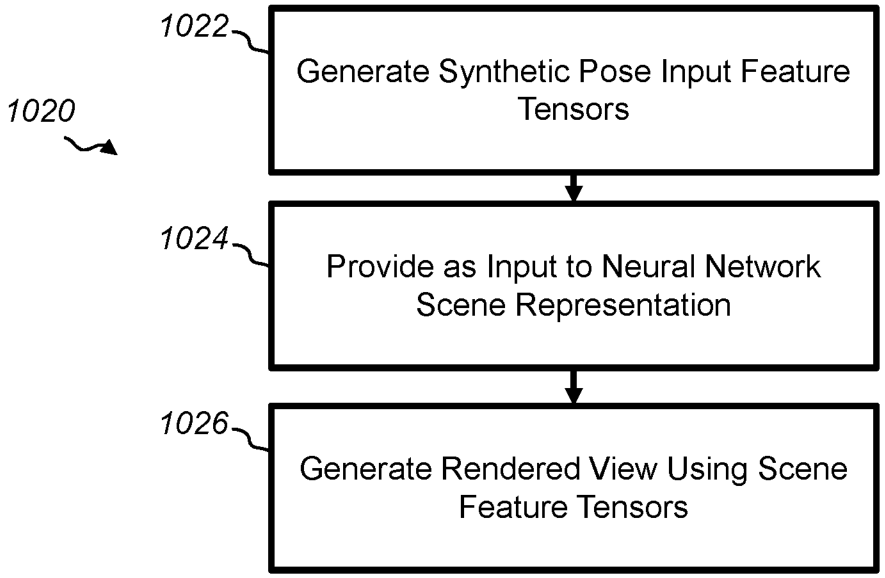

FIG. 10B shows a second method 1020 that may be applied in addition to the method 1000 in one variation of the sixth embodiment. At operation 1022, the method 1020 comprises generating one or more input feature tensors for the neural network scene representation that are indicative of a synthetic pose of the object. For example, this may be performed as described with reference to FIG. 3A. At block 1024, the method 1020 comprises supplying the one or more input feature tensors to the neural network scene representation. For example, this may comprise supplying sample coordinates 312 to a fully-connected neural network architecture 320, including supplying sample coordinates 312 to at least a feature mapping portion 324 of said fully-connected neural network architecture 320. This may also comprise, in certain cases, also performing a view-based mapping of the scene feature tensors to an output colour value, e.g. similar to the colour mapping portion 328 in FIG. 3B, where the input feature tensors also comprise a view direction such as 314. Lastly, at operation 1026, the method comprises generating a rendered view from the synthetic pose using the output scene feature tensors of the neural network scene representation. This may comprise, for example, applying a volume rendering operation such as 340 in FIG. 3A. When using the method 1020, the rendered view and the synthetic pose may form part of a set of image data and pose data that is used as part of an optimisation performed by the differentiable mapping engine. For example, this is described in further detail with reference to the examples of FIGS. 6 and 8.

In certain particular implementations, the method 1020 may comprise: modelling a set of rays from the synthetic pose that pass through the environment; determining a set of points and a viewing direction for each ray in the set of rays; determining a set of input coordinate tensors for the neural network scene representation based on the points and viewing directions for the set of rays; using the neural network scene representation to map the set of input coordinate tensors to a corresponding set of scene feature tensors and colour component values for the set of rays; and rendering the output of the neural network scene representation as a two-dimensional image. These operations may use known ray tracing and volume rendering approaches from the fields of 3D computer graphics. For example, a volume rendering operation such as 340 in FIG. 3A may be performed using a known 3D model engine that operates on sets of input coordinates 312, viewing directions 314, volume densities 332 and colour values 334. However, the present examples also allow the scene feature tensors 326 to be used in other predictive operations without an explicit pairing of point cloud location and metadata values.

In certain cases, the method 1000 may further comprise obtaining trained parameter values for the neural network scene representation, the trained parameter values representing a neural map of at least a portion of the environment; and determining a set of updates for the trained parameter values while tracking the object within the environment using the differentiable mapping engine, wherein the set of updates comprise an update for the neural map. For example, these operations may be performed based on the training shown in FIG. 2C or FIGS. 9A to 9C. In one case, a first learning rate may be used to determine the trained parameter values during a first training stage and a second learning rate may be used to determine the set of updates for the trained parameter values while tracking the object within the environment, where the second learning rate is smaller than the first learning rate. Hence, as described with respect to the examples of FIG. 2C or FIGS. 9A to 9C, the updating of the neural network scene representation may be controlled based on requirements.

In one set of variations, the above-described methods may use an initial 3D model to determine the parameters for the neural network scene representation. In these variations, the method 1000 may further comprise: obtaining an initial version of a three-dimensional model of the environment; and using the initial version of the three-dimensional model to determine trained parameter values for the neural network scene representation, wherein the neural network scene representation rather than the three-dimensional model is used for tracking the object within the environment. These operations may be implemented using the model-to-scene convertor 940 described with respect to FIGS. 9A and 9B. In certain cases, the method may also comprise updating the trained parameter values while tracking the object within the environment using the differentiable mapping engine and using the updated trained parameter values and the neural network scene representation to generate an updated version of the three-dimensional model of the environment. For example, these operations may be implemented using the 3D model generator 930 of FIGS. 9A and 9B. In certain cases, these methods may further comprise comparing the initial version of the three-dimensional model and the updated version of the three-dimensional model and outputting a set of changes to the three-dimensional model based on the comparing. For example, this may be performed using the model comparator 950 of FIG. 9B.

Method of Training a Mapping System

Figure 11:
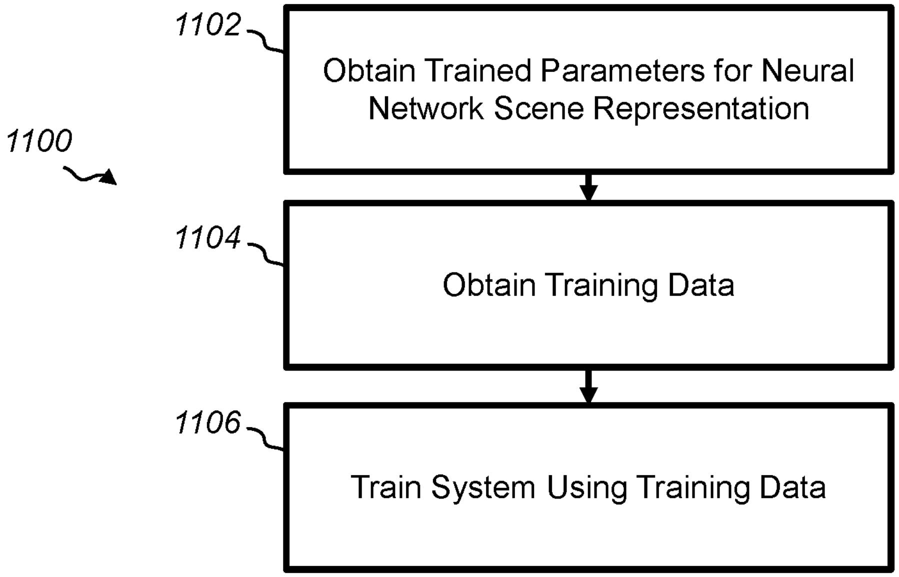
FIG. 11 is a flow chart showing a method of training a mapping system according to a seventh embodiment.

In certain examples above, such as FIG. 2C and FIGS. 9A and 9B, methods of training a mapping system, including methods of training a neural network scene representation, have been described. FIG. 11 shows an example method 1100 of configuring a system for simultaneous localisation and mapping that may be used with the above-described mapping systems.

At operation 1102, the method 1100 comprises obtaining trained parameters for a neural network scene representation. The neural network scene representation may comprise a neural network architecture as described above. The neural network architecture is trained to map input coordinate tensors indicating at least a point location in three-dimensional space to scene feature tensors having a dimensionality greater than the input tensors. For example, this is described in detail with reference to at least FIGS. 3A and 3B. Trained parameters may be obtained as known in the art, e.g. may be loaded from a file storing a set of weights.

At operation 1104, the method 1100 comprises obtaining training data comprising a sequence of images captured using one or more camera devices of an object during navigation of an environment and a corresponding sequence of poses of the object determined during the navigation. For example, the training data may comprise the training data 150 or 250 described with reference to FIGS. 1A to 2C. Training data may be stored as one or more files upon a storage device, e.g. a set of image files and a file storing a multidimensional array of corresponding pose definitions.

At operation 1106, the method 1100 comprises using the training data to train the system for simultaneous localisation and mapping. This may comprise using a training engine such as 170 or 270 in the aforementioned examples. In this case, during an inference mode, the differentiable mapping engine may be configured to determine pose data from input image data and the neural network scene representation may be configured to map pose data to projected image data. Further details of an inference mode are also described with respect to the embodiment of FIG. 6. In the case of the method 1100, the system may be trained, e.g. end-to-end by optimising at least a photometric error loss function between the input image data and the projected image data.

In one case, the differentiable mapping engine comprises at least one neural network architecture and wherein parameters for the differentiable mapping engine and the neural network scene representation are trained together. For example, this is shown in FIGS. 1B and 2B. In another case, the differentiable mapping engine comprises at least one neural network architecture and the system for simultaneous localisation and mapping is trained in at least a first stage where the trained parameters for the neural network scene representation are fixed and parameters for the differentiable mapping engine are determined. Operation 1102 may comprise training the neural network scene representation using training data comprising pose data and image data, e.g. as shown in FIG. 2C.

In certain cases, the mapping systems, neural network scene representations, mapping engines and/or other components may be implemented, at least in part, by computer program instructions that are implemented by at least one processor. In certain cases, operations that involve computations with tensors may use one or more of specialised graphical processing units (GPUs) or tensor processing units (TPUs). In one case, a computer program may be provided with instructions to perform any of the methods or processes described herein. A computer program product may also be provided that carries the computer program.

Figure 12:
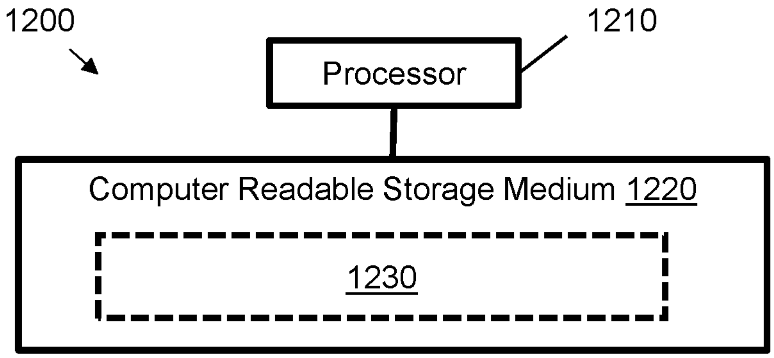
FIG. 12 is a schematic illustration showing a non-transitory computer readable storage medium storing instructions for implementing a mapping system.

In certain cases, system components and methods described herein may be implemented by way of computer program code that is storable on a non-transitory storage medium. FIG. 12 shows a particular example 1200 of a system comprising at least one processor 1210 arranged to retrieve data from a computer-readable storage medium 1220. The system may comprise part of a mobile robotic device or mobile computing device as described above. The computer-readable storage medium 1220 comprises a set of computer-readable instructions 1230, stored thereon. The instructions 1230 are arranged to cause the at least one processor 1210 to perform a series of actions. These actions may comprise the methods 1000, 1020 or 1100 or their variations.

Certain examples described herein provide new methodologies for configuring, training and testing neural network mapping architectures. Training optimisation may be based on both camera movements (e.g., as represented by image and/or pose data) and an improved 3D representation of the environment (e.g., scene feature tensors from the neural network scene representation). Certain examples provide improvements over comparative deep learning methods for mapping by allowing simulations of how a scene will look synthetically. Comparative deep SLAM methods often focus on optimising neural network components to estimate camera movements only; this results in learnt parameters for neural network components that have a poor "understanding" of the environment and thus exhibit glitches, issues and bugs. Certain examples not only provide, e.g. during testing or inference, better digital maps of an environment but also provide more information to tracking systems by allowing synthetic views. This may allow mapping systems to operate with simulated data that reflects viewpoints or perspectives that the mapping system is not physically able to obtain. The present examples also do not require labelled training data; training may be performed with just collections of data (e.g., images and poses) that are obtained via exploration (e.g., in a controlled fashion or from imperfect previous SLAM explorations). In certain examples, for both training and testing, a neural network scene representation may be trained using obtained datasets and a coupled mapping system may use the output of the neural network scene representation to track a camera or object (e.g., determine rotations and translations between points in time). In certain cases, the neural network scene representation may be used to generate synthetic views for use in tracking. Synthetic views may also be used for training of neural network components of the mapping system. In use, synthetic views may be used as auxiliary data for improving the accuracy of known tracking systems.

If not explicitly stated, all of the publications referenced in this document are herein incorporated by reference. The above examples are to be understood as illustrative. Further examples are envisaged. Although certain components of each example have been separately described, it is to be understood that functionality described with reference to one example may be suitably implemented in another example, and that certain components may be omitted depending on the implementation. It is to be understood that any feature described in relation to any one example may be used alone, or in combination with other features described, and may also be used in combination with one or more features of any other of the examples, or any combination of any other of the examples. For example, features described with respect to the system components may also be adapted to be performed as part of the described methods. Furthermore, equivalents and modifications not described above may also be employed without departing from the scope of the invention, which is defined in the accompanying claims.

The invention claimed is:

1. A mapping system comprising:

a differentiable mapping engine to receive image data comprising a sequence of images captured using one or more camera devices of an object as it navigates an environment; and a neural network scene representation comprising a neural network architecture trained to map input coordinate tensors indicating at least a point location in three-dimensional space to scene feature tensors having a dimensionality greater than the input tensors, the neural network scene representation being communicatively coupled to the differentiable mapping engine, wherein the differentiable mapping engine is configured to use the neural network scene representation as a mapping of the environment during operation of the differentiable mapping engine, wherein the differentiable mapping engine comprises one or more neural networks, and wherein the neural network scene representation and the differentiable mapping engine are trained end-to-end using an optimisation function, wherein the differentiable mapping engine is configured to map the sequence of images to a sequence of poses, wherein a training set for training of the system comprises samples of image data and known pose data, and wherein the differentiable mapping engine comprises:

an image feature extractor comprising one or more neural networks to map an input image to an image feature tensor, wherein the differentiable mapping engine is configured to determine correspondences between image feature tensors over time to determine one or more poses of the object.

2. The mapping system of claim 1, wherein the differentiable mapping engine further comprises:

a differentiable visual odometry engine to receive the image data and to output pose data for the object, wherein the differentiable visual odometry module comprises one or more neural networks that are trained using the scene feature tensors output by the neural network scene representation; and one or more of a pose graph optimiser and a bundle adjustment engine to optimise an initial sequence of poses for the object determined by the differentiable mapping engine based on at least the sequence of images, the initial sequence of poses, and the output of the neural network scene representation.

3. The mapping system of claim 1, comprising:

a synthetic view generator to:

generate one or more input feature tensors for the neural network scene representation that are indicative of a synthetic pose of the object, supply the one or more input feature tensors to the neural network scene representation, and generate a rendered view from the synthetic pose using the output scene feature tensors of the neural network scene representation;

wherein the differentiable mapping engine is configured to use a set of rendered views output by the synthetic view generator to track the object within the environment.

4. The mapping system of claim 3, wherein the neural network scene representation comprises a first neural network architecture to map the input coordinate tensors to the scene feature tensors, and a second neural network architecture to map the scene feature tensors to a colour component value, wherein the synthetic view generator is further configured to:

model a set of rays from the synthetic pose that pass through the environment;

determine a set of points and a viewing direction for each ray in the set of rays;

determine a set of input coordinate tensors for the neural network scene representation based on the points and viewing directions for the set of rays;

use the neural network scene representation to map the set of input coordinate tensors to a corresponding set of scene feature tensors and colour component values for the set of rays; and render the output of the neural network scene representation as a two-dimensional image.

5. The mapping system of claim 1, wherein parameters for the neural network architecture of the neural network scene representation are determined for a plurality of landmarks within the environment, each landmark representing a different scene of the environment.

6. The mapping system of claim 1, wherein the differentiable mapping engine comprises:

a place recognition engine to determine if a current object location is a known object location based on data generated by one or more of the neural network scene representation and the differentiable mapping engine.

7. The mapping system of claim 1, comprising:

a three-dimensional model generator communicatively coupled to the neural network scene representation, the three-dimensional model generator using an output of the neural network scene representation to generate a three-dimensional model of the environment.

8. The mapping system of claim 7, wherein the three-dimensional model comprises a point cloud model with geometric structures represented using coordinates within a three-dimensional frame of reference, wherein the three-dimensional model represents geometric structures using point coordinates within a three-dimensional frame of reference and metadata associated with the point coordinates, and wherein the three-dimensional model generator is configured to map scene feature tensors output by the neural network scene representation for determined point coordinates to said metadata.

9. The mapping system of claim 1, comprising:

a model-to-scene converter to train parameters for the neural network architecture of the neural network scene representation based on a supplied three-dimensional model of a modelled environment.

10. The mapping system of claim 9, comprising:

a training engine to update the trained parameters of the neural network architecture during navigation of the modelled environment based on received image data from the one or more camera devices of the object;

a comparator to determine differences between the supplied three-dimensional model and a representation of the environment generated using the updated parameters of neural network scene representation.

11. The mapping system of claim 10, comprising:

a scene-to-model converter to generate a three-dimensional model of the representation of the environment based on an output of the neural network scene representation using the updated parameters, wherein the comparator is configured to compare the supplied three-dimensional model and an output of the scene-to-model converter.

12. The mapping system of claim 1, further comprising:

a scene comparator to receive scene feature tensors for two or more instantiations of the neural network scene representation and to determine a set of differences between the two instantiations.

13. A method for mapping an environment, the method comprising:

obtaining image data from one or more camera devices of an object as it navigates an environment; and tracking the object within the environment using a differentiable mapping engine, wherein the differentiable mapping engine is configured using a neural network scene representation comprising a neural network architecture trained to map input coordinate tensors indicating at least a point location in three-dimensional space to scene feature tensors having a dimensionality greater than the input tensors, the neural network scene representation being communicatively coupled to the differentiable mapping engine, wherein the differentiable mapping engine is configured to use the neural network scene representation as a mapping of the environment during operation of the differentiable mapping engine, wherein tracking the object within the environment using the differentiable mapping engine comprises:

determining a sequence of transformations from successive sets of image data obtained over time from the one or more camera devices, the sequence of transformations defining a set of poses of the object over time; and optimising the sequence of poses, wherein the neural network scene representation is used to determine image data observable from a supplied pose for one or more of the determining and the optimising, the image data representing a projection of the mapping of the environment onto an image plane of the pose.

14. The method of claim 13, comprising:

extracting features from an input frame of image data obtained from the one or more camera devices using an image feature extractor; and determining the sequence of transformations based on correspondences between the extracted features, wherein the image feature extractor comprises a neural network architecture that is trained based on training data comprising samples of image data and object poses, wherein tracking the object within the environment using a differentiable mapping engine comprises:

generating one or more input feature tensors for the neural network scene representation that are indicative of a synthetic pose of the object;

supplying the one or more input feature tensors to the neural network scene representation; and generating a rendered view from the synthetic pose using the output scene feature tensors of the neural network scene representation, wherein the rendered view and the synthetic pose form part of a set of image data and pose data that is used as part of an optimisation performed by the differentiable mapping engine.

15. The method of claim 13, comprising:

obtaining trained parameter values for the neural network scene representation, the trained parameter values representing a neural map of at least a portion of the environment; and determining a set of updates for the trained parameter values while tracking the object within the environment using the differentiable mapping engine, wherein the set of updates comprise an update for the neural map.

16. The method of claim 13, comprising:

obtaining an initial version of a three-dimensional model of the environment;

using the initial version of the three-dimensional model to determine trained parameter values for the neural network scene representation, wherein the neural network scene representation rather than the three-dimensional model is used for tracking the object within the environment;

updating the trained parameter values while tracking the object within the environment using the differentiable mapping engine;

using the updated trained parameter values and the neural network scene representation to generate an updated version of the three-dimensional model of the environment;

comparing the initial version of the three-dimensional model and the updated version of the three-dimensional model; and outputting a set of changes to the three-dimensional model based on the comparing.

17. A method of configuring a system for simultaneous localisation and mapping, the method comprising:

obtaining trained parameters for a neural network scene representation comprising a neural network architecture, the neural network architecture being trained to map input coordinate tensors indicating at least a point location in three-dimensional space to scene feature tensors having a dimensionality greater than the input tensors;

obtaining training data comprising a sequence of images captured using one or more camera devices of an object during navigation of an environment and a corresponding sequence of poses of the object determined during the navigation; and using the training data to train the system for simultaneous localisation and mapping, wherein during an inference mode a differentiable mapping engine is configured to determine pose data from input image data and the neural network scene representation is configured to map pose data to projected image data, the system being trained by optimising a photometric error loss function between the input image data and the projected image data, wherein the differentiable mapping engine comprises at least one neural network architecture and wherein parameters for the differentiable mapping engine and the neural network scene representation are trained together, wherein obtaining trained parameters for the neural network scene representation comprises training the neural network scene representation using training data comprising pose data and image data, wherein the differentiable mapping engine is configured to determine correspondences between image feature tensors over time to determine one or more poses of the object.

* * * * *